United States Patent
Matsuda et al.

(10) Patent No.: US 8,883,317 B2
(45) Date of Patent: *Nov. 11, 2014

(54) INTERMEDIATE FILM FOR LAMINATED GLASS AND LAMINATED GLASS

(75) Inventors: Shota Matsuda, Osaka (JP); Michio Shimamoto, Osaka (JP); Sinyul Yang, Osaka (JP); Kohei Kani, Kouka (JP); Tatsuya Iwamoto, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/825,974

(22) PCT Filed: Sep. 30, 2011

(86) PCT No.: PCT/JP2011/072614
§ 371 (c)(1),
(2), (4) Date: Mar. 25, 2013

(87) PCT Pub. No.: WO2012/043817
PCT Pub. Date: Apr. 5, 2012

(65) Prior Publication Data
US 2013/0189528 A1   Jul. 25, 2013

(30) Foreign Application Priority Data

Sep. 30, 2010  (JP) ................ 2010-222869
Jun. 29, 2011  (JP) ................ 2011-144859

(51) Int. Cl.
| | |
|---|---|
| *B32B 17/10* | (2006.01) |
| *B32B 27/22* | (2006.01) |
| *B32B 27/30* | (2006.01) |
| *C08K 5/00* | (2006.01) |

(52) U.S. Cl.
CPC ....... B32B 17/10761 (2013.01); *B32B 2250/03* (2013.01); B32B 17/10605 (2013.01); *B32B 2605/18* (2013.01); *B32B 2605/12* (2013.01); B32B 27/22 (2013.01); B32B 27/306 (2013.01); B32B 17/10036 (2013.01); *B32B 2307/102* (2013.01); *B32B 2605/08* (2013.01); C08K 5/0016 (2013.01); *B32B 2605/10* (2013.01)
USPC ............ 428/436; 428/437; 428/524; 428/525

(58) Field of Classification Search
USPC .................................. 428/436, 437, 524, 525
See application file for complete search history.

(56) References Cited

U.S. PATENT DOCUMENTS

| | | |
|---|---|---|
| 5,340,654 A | 8/1994 | Ueda et al. |
| 5,936,014 A | 8/1999 | Voigt et al. |

(Continued)

FOREIGN PATENT DOCUMENTS

| | | |
|---|---|---|
| CN | 101426746 A | 5/2009 |
| EP | 0 742 585 A1 | 11/1996 |

(Continued)

OTHER PUBLICATIONS

International Preliminary Report on Patentability for Application No. PCT/JP2011/072614 mailed Apr. 4, 2013.

(Continued)

*Primary Examiner* — D. S. Nakarani
(74) *Attorney, Agent, or Firm* — Cheng Law Group, PLLC

(57) ABSTRACT

The present invention aims to provide an intermediate film for laminated glass which, in the case of being used for constituting a laminated glass, enables to improve the sound-insulating property in a high frequency range of the obtained laminated glass over a wide range of temperature; and a laminated glass. The intermediate film 1 for laminated glass of the present invention comprises a first layer 2 and a second layer 3 which is laminated on a first surface 2a of the first layer 2, each of the first and second layers 2 and 3 contains a polyvinyl acetal resin and a plasticizer, the absolute value of the difference between SP values of the polyvinyl acetal resin and the plasticizer contained in the first layer 2 is 0.5 or smaller, and the laminated glass of the present invention comprises first and second components for laminated glass and the intermediate layer 1 sandwiched between the first and second components for laminated glass.

15 Claims, 2 Drawing Sheets

(56) References Cited

U.S. PATENT DOCUMENTS

2009/0305058 A1   12/2009   Marumoto
2012/0021231 A1   1/2012   Hirota et al.

FOREIGN PATENT DOCUMENTS

| | | |
|---|---|---|
| JP | 6-926 A | 1/1994 |
| JP | 8-302044 A | 11/1996 |
| JP | 10-510853 A | 10/1998 |
| JP | 2000-326445 A | 11/2000 |
| JP | 2007-70200 A | 3/2007 |
| WO | WO-2010/095749 A1 | 8/2010 |

OTHER PUBLICATIONS

International Search Report for the Application No. PCT/JP2011/072614 mailed Dec. 27, 2011.

International Preliminary Report on Patentability for Application No. PCT/JP2011/072614 mailed Nov. 12, 2012.

INTERMEDIATE FILM FOR LAMINATED GLASS AND LAMINATED GLASS

TECHNICAL FIELD

The present invention relates to an intermediate film for laminated glass used for laminated glasses of automobiles and buildings. The present invention specifically relates to an intermediate film for laminated glass containing a polyvinyl acetal resin and a plasticizer, and a laminated glass comprising the intermediate film for laminated glass.

BACKGROUND ART

Laminated glasses scatter fewer pieces of broken glass when they are damaged by external impact, and thus are excellently safe. Therefore, such laminated glasses are widely used in automobiles, railway carriages, aircrafts, ships, buildings, and the like. The laminated glass is produced by interposing an intermediate film between a pair of glass plates.

In order to reduce the weight of a laminated glass, studies have recently been performed for making a laminated glass thin. A thinner laminated glass, however, has a reduced sound-insulating property. If a laminated glass with a reduced sound-insulating property is used for the windshield of an automobile, its sound-insulating property is disadvantageously insufficient against sounds at a register of about 5,000 Hz, such as wind noise and driving sound of wipers.

Then, additional studies have been performed for increasing the sound-insulating property of a laminated glass by changing materials of an intermediate film.

Patent Document 1 discloses, as one example of an intermediate film for laminated glass, a sound-insulating layer comprising 100 parts by weight of a polyvinyl acetal resin with a degree of acetalization of 60 to 85 mol %, 0.001 to 1.0 parts by weight of at least one metal salt selected from alkali metal salts and alkaline earth metal salts, and 30 parts by weight or more of a plasticizer. This sound-insulating layer can be used alone as an intermediate film, or can be laminated with another layer and used as a multilayer intermediate film.

PRIOR ART DOCUMENT

Patent Document

Patent Document 1: JP 2007-070200 A

SUMMARY OF THE INVENTION

Problems to be Solved by the Invention

In recent years, fuel automobiles using internal-combustion engines are being switched over to electric vehicles using electric motors, hybrid electric vehicles using internal-combustion engines and electric motors, and the like. Laminated glasses used for fuel automobiles using internal-combustion engines are particularly required to have a sound-insulating property against sounds in a relatively low frequency range. Even laminated glasses used for fuel automobiles using internal-combustion engines also preferably have a high sound-insulating property against sounds in a high frequency range. In contrast, laminated glasses used for electric vehicles and hybrid electric vehicles utilizing electric motors are particularly required to have a high sound-insulating property against sounds in a high frequency range in order to effectively insulate driving sounds of their electric motors.

In the case of forming a laminated glass using the intermediate film disclosed in Patent Document 1, the sound-insulating property of the laminated glass in a high frequency range is insufficient, and thus reduction in the sound-insulating property due to the coincidence effect cannot be avoided in some cases.

Here, the coincidence effect is a phenomenon that, when sound waves strike a glass plate, the transverse wave is propagated on the glass surface due to the rigidity and inertia of the glass plate, and then the transverse wave resonates with the incident sound, so that the sound is transmitted. In addition, the laminated glass is also required to exert a high sound-insulating property in a wide range of temperature.

Further, in the case of forming a laminated glass using a multilayer intermediate film disclosed in Patent Document 1 in which the sound-insulating layer and other layers are laminated, the sound-insulating property of the laminated glass at around 20° C. can be improved to some extent. In this case, however, the multilayer intermediate film has the sound-insulating layer, and thus bubble formation may occur in the laminated glass including the multilayer intermediate film.

Furthermore, recently, it has been studied to increase the amount of a plasticizer contained in an intermediate film in order to improve the sound-insulating property of a laminated glass. As the amount of a plasticizer in an intermediate film increases, the sound-insulating property of the laminated glass can be improved. If the amount of a plasticizer increases, however, bubble formation may occur in the laminated glass.

An object of the present invention is to provide an intermediate film for laminated glass which, if it is used for forming a laminated glass, can improve the sound-insulating property in a high frequency range of the laminated glass to be obtained over a wide range of temperature, and a laminated glass comprising the intermediate film for laminated glass.

A limitative object of the present invention is to provide an intermediate film for laminated glass which can provide a laminated glass that not only has a high sound-insulating property in a high frequency range over a wide range of temperature but also suppresses bubble formation and bubble growth, and a laminated glass comprising the intermediate film for laminated glass.

Means for Solving the Problems

According to one wide aspect of the present invention, an intermediate film for laminated glass is provided, and this intermediate film comprises: a first layer which contains a polyvinyl acetal resin and a plasticizer; and a second layer which is laminated on a first surface of the first layer and which contains a polyvinyl acetal resin and a plasticizer, wherein an absolute value of the difference between SP values of the polyvinyl acetal resin and the plasticizer contained in the first layer is 0.5 or smaller.

In a certain specific aspect of the intermediate film for laminated glass of the present invention, a hydroxy group content in the polyvinyl acetal resin contained in the first layer is lower than a hydroxy group content in the polyvinyl acetal resin contained in the second layer.

In another specific aspect of the intermediate film for laminated glass of the present invention, the hydroxy group content in the polyvinyl acetal resin contained in the first layer is lower than the hydroxy group content in the polyvinyl acetal resin contained in the second layer by 5 mol % or higher.

In another specific aspect of the intermediate film for laminated glass of the present invention, the plasticizer contained in the first layer is a diester plasticizer represented by the following formula (1A):

[Chem. 1]

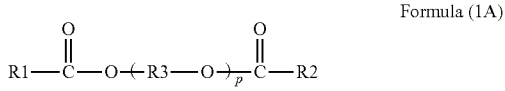

Formula (1A)

wherein R1 and R2 each represent a C1-C5 organic group; R3 represents an ethylene group, an isopropylene group, or an n-propylene group; and p is an integer of 2 to 10.

In another specific aspect of the intermediate film for laminated glass of the present invention, the hydroxy group content in the polyvinyl acetal resin contained in the first layer is lower than 25 mol %.

In still another specific aspect of the intermediate film for laminated glass of the present invention, the hydroxy group content in the polyvinyl acetal resin contained in the second layer is 10 mol % or higher and 50 mol % or lower, and the degree of acetylation therein is lower than 3 mol %.

In another specific aspect of the intermediate film for laminated glass of the present invention, an amount of the plasticizer is 20 to 90 parts by weight for each 100 parts by weight of the polyvinyl acetal resin in the first layer.

In still another specific aspect of the intermediate film for laminated glass of the present invention, an amount of the plasticizer is 10 to 50 parts by weight for each 100 parts by weight of the polyvinyl acetal resin in the second layer.

In another specific aspect of the intermediate film for laminated glass of the present invention, an amount of the plasticizer is 50 parts by weight or more for each 100 parts by weight of the polyvinyl acetal resin contained in the first layer; a hydroxy group content in the polyvinyl acetal resin in the first layer is lower than a hydroxy group content in the polyvinyl acetal resin contained in the second layer; the difference between the hydroxy group content in the polyvinyl acetal resin contained in the first layer and the hydroxy group content in the polyvinyl acetal resin contained in the second layer is 9.2 mol % or smaller; and the degree of acetylation in the polyvinyl acetal resin contained in the first layer is 8 mol % or lower if the difference between the hydroxy group content in the polyvinyl acetal resin contained in the first layer and the hydroxy group content in the polyvinyl acetal resin contained in the second layer is greater than 8.5 mol % but not greater than 9.2 mol %.

In another specific aspect of the intermediate film for laminated glass of the present invention, in the case that the first layer is used as a resin film and a viscoelasticity of the resin film is measured, a ratio (G'(Tg+80)/G'(Tg+30)) of an elastic modulus G'(Tg+80) at (Tg+80)° C. to an elastic modulus G'(Tg+30) at (Tg+30)° C. is 0.65 or higher, provided that Tg (° C.) represents a glass transition temperature of the resin film.

In another specific aspect of the intermediate film for laminated glass of the present invention, the polyvinyl acetal resin contained in the first layer is obtained by acetalizing polyvinyl alcohol having an average degree of polymerization exceeding 3,000.

In a certain specific aspect of the intermediate film for laminated glass of the present invention, preferably, the degree of acetylation in the polyvinyl acetal resin contained in the first layer is 8 mol % or higher, or the degree of acetylation in the polyvinyl acetal resin contained in the first layer is lower than 8 mol %, and a degree of acetalization therein is 68 mol % or higher. The degree of acetylation in the polyvinyl acetal resin contained in the first layer is preferably 8 mol % or higher. Also, preferably, the degree of acetylation in the polyvinyl acetal resin contained in the first layer is lower than 8 mol %, and the degree of acetalization is 68 mol % or higher.

In another specific aspect of the intermediate film for laminated glass of the present invention, the intermediate film further comprises a third layer which is laminated on a second surface that is opposite to the first surface of the first layer and which contains a polyvinyl acetal resin and a plasticizer.

The laminated glass of the present invention comprises a first component for laminated glass; a second component for laminated glass; and an intermediate film sandwiched between the first component for laminated glass and the second component for laminated glass, wherein the intermediate film is the intermediate film for laminated glass formed according to the present invention.

Effect of the Invention

The intermediate film for laminated glass of the present invention has a structure in which a first layer and a second layer are laminated, the first layer and the second layer each contain a polyvinyl acetal resin and a plasticizer, and the absolute value of the difference between the SP values of the polyvinyl acetal resin and the plasticizer contained in the first layer is 0.5 or smaller. Therefore, the sound-insulating property in a high frequency range of a laminated glass using the intermediate film for laminated glass of the present invention can be improved over a wide range of temperature.

MODE(S) FOR CARRYING OUT THE INVENTION

Figure 1:
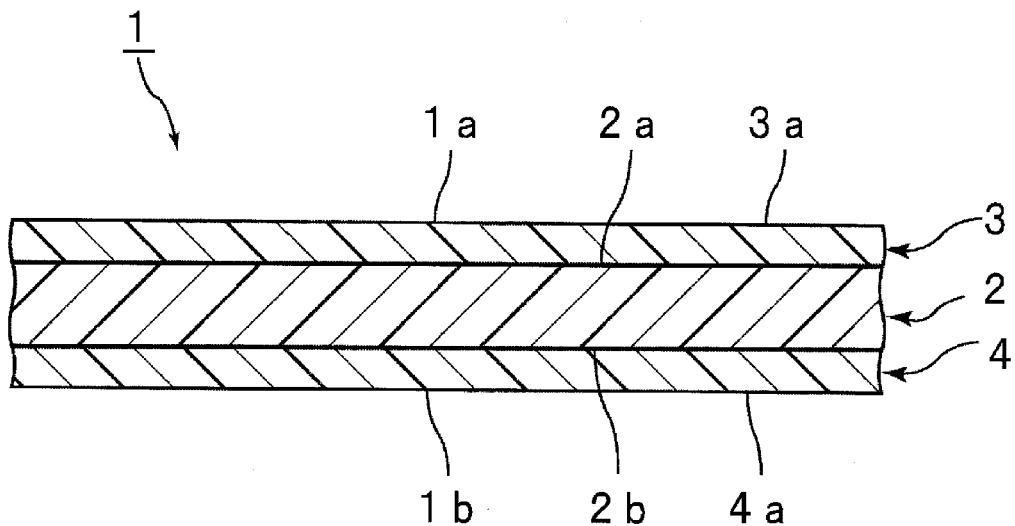
FIG. 1 is a partially cut cross-sectional view schematically showing an intermediate film for laminated glass according to one embodiment of the present invention.

The following will describe specific embodiments and examples of the present invention referring to the drawings, and thereby clarify the present invention.

FIG. 1 is a partially cut cross-sectional view schematically showing an intermediate film for laminated glass according to one embodiment of the present invention.

An intermediate film 1 shown in FIG. 1 is a multilayer intermediate film. The intermediate film 1 is used for obtaining a laminated glass. The intermediate film 1 is an intermediate film for laminated glass. The intermediate film 1 comprises a first layer 2, a second layer 3 laminated on a first surface 2a of the first layer 2, and a third layer 4 laminated on a second surface 2b opposite to the first surface 2a of the first layer 2. The first layer 2 is an intermediate layer, and mainly functions as a sound-insulating layer. The second layer 3 and the third layer 4 are protecting layers, and are surface layers in the present embodiment. The first layer 2 is sandwiched between the second layer 3 and the third layer 4. Thus, the intermediate film 1 has a multilayer structure in which the second layer 3, the first layer 2, and the third layer 4 are laminated in this order.

The first layer 2, the second layer 3 and the third layer 4 each contain a polyvinyl acetal resin and a plasticizer. The absolute value of the difference between the SP values of the polyvinyl acetal resin and the plasticizer contained in the first layer 2 is 0.5 or smaller. The composition of the second layer 3 and that of the third layer 4 may be the same as or different from each other. Since the second layer 3 and the third layer 4 each contain a polyvinyl acetal resin, the adhesive force of the second layer 3 and the third layer 4 with components for laminated glass is sufficiently high.

The plasticizer contained in the first layer 2 may transfer to the second layer 3 and the third layer 4 depending on the environmental temperature. Also, the plasticizers contained in the second layer 3 and the third layer 4 to the first layer 2 depending on the environmental temperature. The sound-insulating property of a laminated glass is affected by the amount of the plasticizer contained in the first layer 2. In order to improve the sound-insulating property in a high-temperature environment, the plasticizer contained in the first layer 2 preferably transfers to the second layer 3 and the third layer 4 so that the amount of the plasticizer contained in the first layer 2 decreases. In order to improve the sound-insulating property in a low-temperature environment, the plasticizers contained in the second layer 3 and the third layer 4 preferably transfer to the first layer 2 so that the amount of the plasticizer contained in the first layer 2 increases. In the present invention, the transfer of the plasticizers is controlled by adjusting the absolute value of the difference between the SP values of the polyvinyl acetal resin and the plasticizer contained in the first layer 2 to 0.5 or smaller, and thereby an intermediate film with a high sound-insulating property in a high frequency range over a wide range of temperature is obtained.

The main features of the present embodiment are that the first layer 2 contains a polyvinyl acetal resin and a plasticizer, and that the absolute value of the difference between the SP values of the polyvinyl acetal resin and the plasticizer contained in the first layer 2 is 0.5 or smaller. Thereby, the sound-insulating property in a high frequency range of a laminated glass using the intermediate film 1 can be improved over a wide range of temperature. In particular, the sound-insulating property in a high frequency range higher than 3 kHz can be effectively improved. The temperature at which the sound-insulating property is obtained depends on the glass transition temperature of the first layer 2. The glass transition temperature is affected by the transfer of the plasticizers between the first layer 2 and the second layer 3 and the third layer 4. As the absolute value of the difference between the SP values of the polyvinyl acetal resin and the plasticizer contained in the first layer 2 is adjusted to the specific value or smaller, the transfer of the plasticizers between the first layer 2 and the second layer 3 and the third layer 4 can be controlled. Thus, the first layer 2 shows a wide variety of glass transition temperatures depending on its outside temperature. As a result, the sound-insulating property can be improved over a wide range of temperature.

In the intermediate film 1, the other layers are laminated on both surfaces of the first layer 2. The second layer is laminated on at least one surface of the first layer. The second layer may be laminated only on a first surface of the first layer and the third layer may not be laminated on a second surface of the first layer. Nevertheless, preferably, the second layer is laminated on the first surface of the first layer and the third layer is laminated on the second surface of the first layer. As the third layer is laminated on the second surface of the first layer, the sound-insulating property in a high frequency range of a laminated glass can be further improved over a wide range of temperature. In addition, as the third layer is laminated on the second surface of the first layer, the handleability of the intermediate layer 1 may be improved.

With an intermediate film for laminated glass having a multilayer structure that provides an improved sound-insulating property, bubble formation problematically easily occurs in the laminated glass. With respect to such a problem, the present inventors have found that, in an intermediate film for laminated glass with a multilayer structure, plasticizers transfer between the respective layers and, as a result, a layer containing a larger amount of plasticizer is formed, that is, for example, the plasticizers transfer from the second layer and the third layer to the first layer so that the amount of the plasticizer in the first layer increases. The present inventors have further found that, as the layer containing a larger amount of plasticizer is formed, in other words, as the amount of the plasticizer in the first layer increases, bubble formation is likely to occur in a laminated glass comprising the intermediate film for laminated glass, and bubble formation once occurs, the generated bubbles tend to serve as cores and thereby to cause bubble growth.

From the viewpoint of suppressing bubble formation and bubble growth in a laminated glass, preferably, the amount of the plasticizer is 50 parts by weight or more for each 100 parts by weight of the polyvinyl acetal resin in the first layer 2; the hydroxy group content in the polyvinyl acetal resin contained in the first layer 2 is lower than the hydroxy group content in the polyvinyl acetal resin contained in the second layer 3; the difference between the hydroxy group content in the polyvinyl acetal resin contained in the first layer 2 and the hydroxy group content in the polyvinyl acetal resin contained in the second layer 3 (hereinafter, also referred to as a content difference (1-2)) is 9.2 mol % or smaller; and if the difference between the hydroxy group content in the polyvinyl acetal resin contained in the first layer 2 and the hydroxy group content in the polyvinyl acetal resin contained in the second layer 3 (content difference (1-2)) is greater than 8.5 mol % but not greater than 9.2 mol %, the degree of acetylation in the polyvinyl acetal resin contained in the first layer 2 is preferably 8 mol % or lower. The content difference (1-2) may be greater than 8.5 mol % but not greater than 9.2 mol %, and further may be 8.5 mol % or smaller.

Preferably, the hydroxy group content in the polyvinyl acetal resin contained in the first layer 2 is lower than the hydroxy group content in the polyvinyl acetal resin contained in the third layer 4; the difference between the hydroxy group content in the polyvinyl acetal resin contained in the first layer 2 and the hydroxy group content in the polyvinyl acetal resin contained in the third layer 4 (hereinafter, also referred to as a content difference (1-3)) is 9.2 mol % or smaller; and if the difference between the hydroxy group content in the polyvinyl acetal resin contained in the first layer 2 and the hydroxy group content in the polyvinyl acetal resin contained in the third layer 4 (content difference (1-3)) is greater than 8.5 mol % but not greater than 9.2 mol %, the degree of acetylation in the polyvinyl acetal resin contained in the first layer 2 is 8 mol % or lower. Even in the case that the content difference (1-3) is 8.5 mol % or smaller, however, the degree of acetylation in the polyvinyl acetal resin contained in the first layer 2 is preferably 8 mol % or lower if the content difference (1-2) is greater than 8.5 mol % but not greater than 9.2 mol %. The content difference (1-3) may be greater than 8.5 mol % but not greater than 9.2 mol % or lower, and further may be 8.5 mol % or smaller.

The present inventors have performed studies for suppressing bubble formation and bubble growth, and thereby found that the aforementioned control of the hydroxy group contents in the polyvinyl acetal resins contained in the first layer, the second layer and the third layer enables to sufficiently suppress bubble formation and bubble growth in a laminated glass.

If the amount of the plasticizer for each 100 parts by weight of the polyvinyl acetal resin in the first layer 2 is more than the amount of the plasticizer for each 100 parts by weight of the polyvinyl acetal resin in each of the second layer 3 and the third layer 4, bubble formation tends to more easily occur. In addition, bubble formation once occurs, the generated bubbles tend to serve as cores and thereby to cause bubble growth. In contrast, if the hydroxy group contents in the polyvinyl acetal resins contained in the first layer, the second layer and the third layer are controlled as mentioned above, bubble formation and bubble growth in a laminated glass can be sufficiently suppressed.

From the viewpoint of further suppressing bubble formation and bubble growth in a laminated glass, with respect to the difference between the hydroxy group content in the polyvinyl acetal resin contained in the first layer 2 and each of the hydroxy group contents in the polyvinyl acetal resins contained in the second layer 3 and the third layer 4 (content difference (1-2) and content difference (1-3)), the lower limit thereof is preferably 0.1 mol %, more preferably 1 mol %, and still more preferably 2 mol %, whereas the upper limit thereof is preferably 8.5 mol %, more preferably 7.8 mol %, still more preferably 7 mol %, and particularly preferably 5.6 mol %. Because bubble formation and bubble growth can be furthermore suppressed in a laminated glass, the difference between the hydroxy group content in the polyvinyl acetal resin contained in the first layer 2 and each of the hydroxy group contents in the polyvinyl acetal resins contained in the second layer 3 and the third layer 4 (content difference (1-2) and content difference (1-3)) is preferably 5 mol % or smaller, more preferably 4.5 mol % or smaller, still more preferably 4 mol % or smaller, and furthermore preferably 3.5 mol % or smaller.

Also, in the case that the first layer 2 is used as a resin film B and the viscoelasticity of the resin film B is measured (test method B), the ratio (G'(Tg+80)/G'(Tg+30)) of the elastic modulus G'(Tg+80) at (Tg+80)° C. to the elastic modulus G'(Tg+30) at (Tg+30)° C. is preferably 0.65 or higher, provided that Tg(° C.) represents the glass transition temperature of the resin film B.

In the test method B, the first layer 2 is used as the resin film B, and the first layer 2 itself is the resin film B.

The resin film B is the first layer 2, and it contains the polyvinyl acetal resin and the plasticizer at the weight ratio as in the first layer 2. In the test method B, preferably, the plasticizer is transferred in the intermediate film 1 for laminated glass, and then the elastic modulus G'(Tg+80) and the elastic modulus G'(Tg+30) are measured. In the test method B, more preferably, the intermediate film 1 for laminated glass is stored at a humidity of 30% (±3%) and at a temperature of 23° C. for one month, the plasticizer is transferred in the intermediate film 1 for laminated glass, and then the elastic modulus G'(Tg+80) and the elastic modulus G'(Tg+30) are measured.

The present inventors have performed studies for suppressing bubble formation and bubble growth, and thereby also found that a ratio (G'(Tg+80)/G'(Tg+30)) of 0.65 or higher in the test method B enables to sufficiently suppress bubble formation and bubble growth in a laminated glass. Even in the case that the amount of the plasticizer in the first layer 2 is large, bubble formation and bubble growth in a laminated glass can be sufficiently suppressed. Thus, the sound-insulating property of the laminated glass can be improved. In particular, use of an intermediate film 1 for laminated glass in which the second layer 3 and the third layer 4 are laminated on the respective surfaces of the first layer 2 configured to have a ratio (G'(Tg+80)/G'(Tg+30)) of 0.65 or higher leads to further suppression of bubble formation and bubble growth in a laminated glass.

The ratio (G'(Tg+80)/G'(Tg+30)) is 0.65 or higher, and preferably 1.0 or lower. A ratio (G'(Tg+80)/G'(Tg+30)) of 0.65 or higher may enable to sufficiently suppress bubble formation and bubble growth in a laminated glass even after the laminated glass is stored under considerably severe conditions or for a long term. Further, a ratio (G'(Tg+80)/G'(Tg+30)) not lower than the lower limit and not higher than the upper limit may enable to more effectively suppress bubble formation and bubble growth in a laminated glass even after the laminated glass is stored under considerably severe conditions or for a long term.

From the viewpoint of sufficiently improving the sound-insulating property of a laminated glass, the amount of the plasticizer is preferably 40 parts by weight or more for each 100 parts by weight of the polyvinyl acetal resin in the first layer 2. Even in the case that the amount of the plasticizer in the first layer is large, the first layer configured to have a ratio (G'(Tg+80)/G'(Tg+30)) of 0.65 or higher may enable to suppress bubble formation and bubble growth in a laminated glass.

The glass transition temperature Tg(° C.) indicates a peak temperature of the loss factor tan δ obtainable from the measurement result of the viscoelasticity. From the viewpoint of further suppressing bubble formation and bubble growth in a laminated glass, the ratio (G'(Tg+80)/G'(Tg+30)) is more preferably 0.7 or higher, whereas more preferably 0.95 or lower, and still more preferably 0.75 or higher, whereas still more preferably 0.9 or lower. Particularly, in the case of controlling the ratio (G'(Tg+80)/G'(Tg+30)) by the average degree of polymerization of polyvinyl alcohol, the ratio (G'(Tg+80)/G'(Tg+30)) is preferably 0.65 or higher, more preferably 0.66 or higher, still more preferably 0.67 or higher, and particularly preferably 0.7 or higher, whereas preferably 0.82 or lower, and more preferably 0.8 or lower, because bubble formation and bubble growth in a laminated glass can be sufficiently suppressed and the sound-insulating property of the laminated glass can be further improved. Furthermore, if the ratio (G'(Tg+80)/G'(Tg+30)) is 0.82 or lower, or 0.8 or lower, an intermediate film can be easily formed.

Examples of the method for controlling the ratio (G'(Tg+80)/G'(Tg+30)) measured by the test method B to 0.65 or higher include a method of using polyvinyl alcohol with a relatively high average degree of polymerization upon synthesis of a polyvinyl acetal resin to be contained in the first layer 2; and a method of strengthening the inter-molecular interaction of the polyvinyl acetal resin contained in the first layer 2. Examples of the method of strengthening the inter-molecular interaction of the polyvinyl acetal resin contained in the first layer 2 include a method of physically cross-linking the molecules of the polyvinyl acetal resin, and a method of chemically cross-linking the molecules. Particularly preferable are a method of using polyvinyl alcohol with a relatively high average degree of polymerization upon synthesis of a polyvinyl acetal resin to be contained in the first layer 2 and a method of physically cross-linking the molecules of the polyvinyl acetal resin contained in the first layer 2 because the intermediate film 1 can be easily formed using an extruder.

Figure 3:
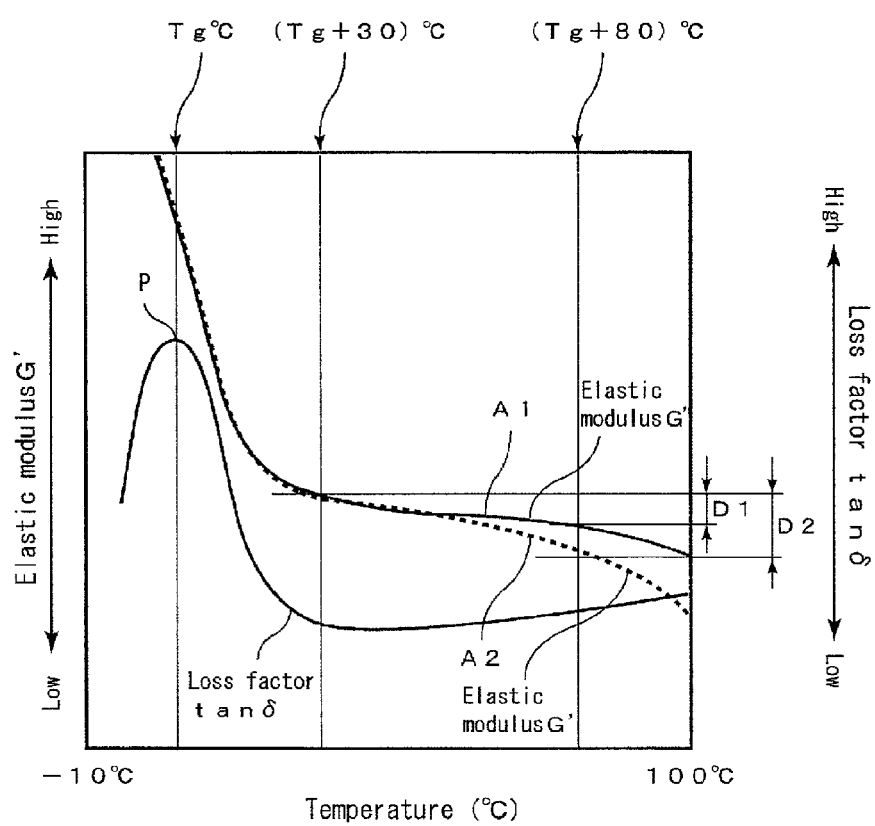
FIG. 3 is a diagram for illustrating the relationship between the loss factor tan δ and the temperature and the relationship between the elastic modulus G' and the temperature in the case that a resin film containing a polyvinyl acetal resin and a plasticizer contained in the first layer is prepared and the viscoelasticity of the resin film is measured.

The following will describe one example of the relationship between the loss factor tan δ and the temperature and the relationship between the elastic modulus G' and the temperature obtained by the aforementioned measurement of the viscoelasticity referring to FIG. 3.

The loss factor tan δ and the temperature show the relationship shown in FIG. 3. The temperature at the peak P of the loss factor tan δ is the glass transition temperature Tg.

In FIG. 3, the glass transition temperature Tg in the elastic modulus G' drawn with the broken line A2 and the glass transition temperature Tg in the elastic modulus G' drawn with the solid line A1 are the same temperature. For example, as the amount of change D of the elastic modulus G'(Tg+80) based on the elastic modulus G'(Tg+30) is smaller, bubble formation and bubble growth in a laminated glass can be more effectively suppressed. The amount of change D1 in the elastic modulus G' drawn with the solid line A1 is smaller than the amount of change D2 in the elastic modulus G' drawn with the broken line A2. Thus, in FIG. 3, bubble formation and bubble growth in a laminated glass can be more effectively suppressed in the case of the elastic modulus G' drawn with the solid line A1 in which the amount of change D1 is relatively small than in the case of the elastic modulus G' drawn with the broken line A2 in which the amount of change D2 is relatively large.

The elastic modulus G'(Tg+30) is preferably 200,000 Pa or higher. The elastic modulus G'(Tg+30) is more preferably 220,000 Pa or higher, still more preferably 230,000 Pa or higher, and particularly preferably 240,000 Pa or higher, whereas preferably 10,000,000 Pa or lower, more preferably 5,000,000 Pa or lower, particularly preferably 1,000,000 Pa or lower, most preferably 500,000 Pa or lower, and still most preferably 300,000 Pa or lower. An elastic modulus G'(Tg+30) not lower than the lower limit may enable to further suppress bubble formation and bubble growth in a laminated glass.

Here, the relationship between the elastic modulus G' and the temperature is greatly influenced by the type of a polyvinyl acetal resin and, in particular, it is greatly influenced by the average degree of polymerization of the polyvinyl alcohol used for providing a polyvinyl acetal resin. The relationship is not greatly influenced by the type of a plasticizer and, if the plasticizer is used in an usual amount of plasticizer, the amount of the plasticizer does not have a great influence thereon.

Also, in order to suppress bubble formation in the intermediate film for laminated glass, the polyvinyl acetal resin contained in the first layer 2 is preferably obtained by acetalization of polyvinyl alcohol with an average degree of polymerization exceeding 3,000. In this case, the ratio (G'(Tg+80)/G'(Tg+30)) is not necessarily 0.65 or higher, but is preferably 0.65 or higher. From the viewpoint of further suppressing bubble formation and bubble growth in a laminated glass, the amount of the plasticizer is preferably 40 parts by weight or more for each 100 parts by weight of the polyvinyl acetal resin obtained by acetalizing the polyvinyl alcohol with an average degree of polymerization exceeding 3,000 in the first layer 2. In addition, from the viewpoint of further suppressing bubble formation and bubble growth in a laminated glass, the hydroxy group content is preferably 30 mol % or lower in the polyvinyl acetal resin obtained by acetalizing the polyvinyl alcohol with an average degree of polymerization exceeding 3,000 in the first layer 2.

From the viewpoint of further improving the sound-insulating property of a laminated glass, the amount of the plasticizer is preferably 40 parts by weight or more, more preferably 50 parts by weight or more, still more preferably 55 parts by weight or more, and particularly preferably 60 parts by weight or more, for each 100 parts by weight of the polyvinyl acetal resin in the first layer 2. Even in the case that the amount of the plasticizer is large in the first layer 2 as mentioned above, bubble formation and bubble growth in a laminated glass can be more effectively suppressed by controlling the hydroxy group contents in the polyvinyl acetal resins contained in the first layer, the second layer and the third layer as mentioned above or by controlling the ratio (G'(Tg+80)/G'(Tg+30)).

The following will describe the details of the first layer, the second layer and the third layer forming the intermediate film for laminated glass of the present invention and the details of the polyvinyl acetal resins and the plasticizers contained in the first layer, the second layer and the third layer.

(Polyvinyl Acetal Resin)

The first layer contains a polyvinyl acetal resin (hereinafter, also referred to as a polyvinyl acetal resin (1)). The second layer contains a polyvinyl acetal resin (hereinafter, also referred to as a polyvinyl acetal resin (2)). The third layer preferably contains a polyvinyl acetal resin (hereinafter, also referred to as a polyvinyl acetal resin (3)). Each of the polyvinyl acetal resin (1), the polyvinyl acetal resin (2) and the polyvinyl acetal resin (3) may include one species of resin or two or more species of resins. Further, the first layer contains a plasticizer (hereinafter, also referred to as a plasticizer (1)).

The polyvinyl acetal resin (1) contained in the first layer is not particularly limited as long as the absolute value of the difference between the SP value thereof and the SP value of the plasticizer (1) is 0.5 or smaller. The "SP value" herein means a solubility parameter. The "SP value" can be calculated by the Fedors method (R. F. Fedors, Polym. Eng. Sci., 14, 147 (1974)).

The SP value of the polyvinyl acetal resin (1) depends on, for example, the type of hydrophobic groups in the polyvinyl acetal resin, the degree of hydrophobicity of the hydrophobic groups, the amount of the hydrophobic groups, the type of hydrophilic groups, the degree of the hydrophilicity of the hydrophilic groups, and the amount of the hydrophilic groups.

As the absolute value of the difference between the SP values of the polyvinyl acetal resin (1) and the plasticizer (1) is 0.5 or smaller, the affinity between the polyvinyl acetal resin (1) and the plasticizer (1) increases. Thus, the first layer shows a variety of glass transition temperatures depending on its outside temperature. As a result, the sound-insulating property in a high frequency range of a laminated glass becomes high over a wide range of temperature. In order to increase the sound-insulating property in a high frequency range of a laminated glass over a wide range of temperature, the absolute value of the difference between the SP values is preferably as small as possible. The absolute value of the difference between the SP values of the polyvinyl acetal resin (1) and the plasticizer (1) is preferably 0.47 or smaller, more preferably 0.4 or smaller, still more preferably 0.3 or smaller, particularly preferably 0.2 or smaller, and most preferably 0.1 or smaller.

For example, the plasticizer contained in the second layer or the third layer may transfer to the first layer. The absolute value of the difference between the SP values of the plasticizer transferred to the first layer and the polyvinyl acetal resin (1) may be 0.5 or smaller, or may exceed 0.5. In order to improve the sound-insulating property in a high frequency range of a laminated glass comprising the intermediate film for laminated glass of the present invention over a wider range of temperature, the absolute value of the difference between the SP values of the plasticizer transferred to the first layer and the polyvinyl acetal resin (1) is preferably 0.5 or smaller, and the absolute value of the difference between the SP values of the plasticizer contained in the second layer or the third layer and the polyvinyl acetal resin (1) is preferably 0.5 or smaller.

The polyvinyl acetal resin (2) and the polyvinyl acetal resin (3) contained in the second layer and the third layer, respectively, are not particularly limited. Conventionally known polyvinyl acetal resins can be used as the polyvinyl acetal resin (2) and the polyvinyl acetal resin (3).

From the viewpoint of further improving the sound-insulating property in a high frequency range of a laminated glass over a wide range of temperature, the hydroxy group content in the polyvinyl acetal resin (1) is preferably lower than each of the hydroxy group contents in the polyvinyl acetal resin (2) and the polyvinyl acetal resin (3). From the viewpoint of furthermore improving the sound-insulating property in a high frequency range of a laminated glass over a wide range of temperature, the hydroxy group content in the polyvinyl acetal resin (1) is lower than each of the hydroxy group contents in the polyvinyl acetal resin (2) and the polyvinyl acetal resin (3) by more preferably 1 mol % or higher, still more preferably 5 mol % or higher, and particularly preferably 7 mol % or higher.

The hydroxy group content (hydroxy group amount) in the polyvinyl acetal resin (1) is preferably 0 mol % or higher, whereas preferably 30 mol % or lower. A hydroxy group content not lower than the lower limit is less likely to cause bleed out of the plasticizer, and the humidity resistance of an intermediate film can be further improved. A hydroxy group content not higher than the upper limit can further improve the penetration resistance of a laminated glass. In addition, the flexibility of an intermediate film may increase, and thus the intermediate film can be easily handled. From the viewpoint of further improving the sound-insulating property in a high frequency range of a laminated glass over a wide range of temperature, the hydroxy group content (hydroxy group amount) in the polyvinyl acetal resin (1) is more preferably lower than 25 mol %, still more preferably 24 mol % or lower, and particularly preferably 23 mol % or lower.

The hydroxy group contents (hydroxy group amounts) in the polyvinyl acetal resin (2) and the polyvinyl acetal resin (3) each are preferably 10 mol % or higher, whereas preferably 50 mol % or lower. If the hydroxy group contents each are not lower than the lower limit, bleed out of the plasticizer is less likely to be caused and the humidity resistance of an intermediate film can be further improved. If the hydroxy group contents each are not higher than the upper limit, the penetration resistance of a laminated glass can be further improved. In addition, the flexibility of the intermediate film may increase, and thus the intermediate film can be easily handled. From the viewpoint of further improving the sound-insulating property in a high frequency range of a laminated glass over a wide range of temperature, the hydroxy group contents (hydroxy group amounts) in the polyvinyl acetal resin (2) and the polyvinyl acetal resin (3) each are more preferably 20 mol % or higher, still more preferably 24 mol % or higher, and particularly preferably 30 mol % or higher, whereas more preferably lower than 40 mol %, still more preferably 35 mol % or lower, and particularly preferably 33 mol % or lower.

Each of the hydroxy group contents in the polyvinyl acetal resin (1), the polyvinyl acetal resin (2) and the polyvinyl acetal resin (3) is a value of mole fraction in terms of percentage (mol %) obtained by dividing the amount of ethylene groups bonded with hydroxy groups by the total amount of ethylene groups in the main chain. The amount of ethylene groups bonded with hydroxy groups can be calculated based on the result measured by the method in conformity with JIS K6728 "Testing Methods for Polyvinyl Butyral" or ASTM D1396-92.

The degree of acetylation (acetyl group amount) in the polyvinyl acetal resin (1) is 0 mol % or higher, whereas preferably 40 mol % or lower. From the viewpoint of further improving the sound-insulating property in a high frequency range of the laminated glass over a wide range of temperature, the degree of acetylation (acetyl group amount) in the polyvinyl acetal resin (1) is more preferably 0.5 mol % or higher, still more preferably 1 mol % or higher, and particularly preferably 3 mol % or higher, whereas more preferably lower than 30 mol %, and still more preferably 25 mol % or lower.

The degrees of acetylation in the polyvinyl acetal resin (2) and the polyvinyl acetal resin (3) each are preferably 0 mol % or higher, whereas preferably 10 mol % or lower. If the degrees of acetylation each are not lower than the lower limit, the humidity resistance of an intermediate film and that of a laminated glass can be high. If the degrees of acetylation each are not higher than the upper limit, the strength of an intermediate film can be high and bleed out of the plasticizer can be suppressed. From the viewpoint of further improving the sound-insulating property in a high frequency range of a laminated glass over a wide range of temperature, the degrees of acetylation in the polyvinyl acetal resin (2) and the polyvinyl acetal resin (3) each are more preferably 8 mol % or lower, still more preferably lower than 3 mol %, and particularly preferably 2 mol % or lower. If the degrees of acetylation in the polyvinyl acetal resin (2) and the polyvinyl acetal resin (3) each are lower than 3 mol %, bleed out of the plasticizers can be further suppressed.

The degree of acetylation is a value of mole fraction in terms of percentage (mol %) obtained by subtracting the amount of ethylene groups bonded with acetal groups and the amount of ethylene groups bonded with hydroxy groups from the total amount of ethylene groups in the main chain, and then dividing this value by the total amount of ethylene groups in the main chain. The amount of ethylene groups bonded with acetal groups can be calculated based on the result measured by the method in conformity with JIS K6728 "Testing Methods for Polyvinyl Butyral" or ASTM D1396-92. The method of measuring the degree of acetylation is preferably in conformity with ASTM D1396-92.

Because the sound-insulating property of a laminated glass can be further improved, the degree of acetylation in the polyvinyl acetal resin contained in the first layer (1) is preferably higher than 8 mol % in the case that the content difference (1-2) is 8.5 mol % or smaller. Because the sound-insulating property of a laminated glass can be further improved, the degree of acetylation in the polyvinyl acetal resin contained in the first layer (1) is preferably higher than 8 mol % in the case that the content difference (1-3) is 8.5 mol % or smaller.

Because the sound-insulating property of a laminated glass can be further improved, the degree of acetalization is preferably 68 mol % or higher or the hydroxy group content is preferably lower than 31.5 mol % in the polyvinyl acetal resin contained in the first layer (1) in the case that the content difference (1-2) is greater than 8.5 mol % but not greater than 9.2 mol % or in the case that the content difference (1-2) is 9.2 mol % or smaller. Because the sound-insulating property of a laminated glass can be further improved, the degree of acetalization is preferably 68 mol % or higher or the hydroxy group content is lower than 31.5 mol % in the polyvinyl acetal resin contained in the first layer (1) in the case that the content difference (1-3) is greater than 8.5 mol % but not greater than 9.2 mol % or the content difference (1-3) is 9.2 mol % or smaller.

The polyvinyl acetal resin (1), the polyvinyl acetal resin (2) and the polyvinyl acetal resin (3) can be produced by acetalizing polyvinyl alcohol with an aldehyde, for example. The polyvinyl alcohol can be obtained by saponifying polyvinyl acetate, for example. The degree of saponification of the polyvinyl alcohol is usually within the range of 70 to 99.9 mol %, preferably within the range of 75 to 99.8 mol %, and more preferably within the range of 80 to 99.8 mol %.

The average degree of polymerization of the polyvinyl alcohol for providing the polyvinyl acetal resin (1), the polyvinyl acetal resin (2) and the polyvinyl acetal resin (3) is preferably 200 or higher, more preferably 500 or higher, still more preferably 1,600 or higher, particularly preferably 2,600 or higher, and most preferably 2,700 or higher, whereas preferably 5,000 or lower, more preferably 4,000 or lower, and still more preferably 3,500 or lower. If the average degree of polymerization is not lower than the lower limit, the penetration resistance of a laminated glass can be further improved. If the average degree of polymerization is not higher than the upper limit, an intermediate film can be easily formed.

From the viewpoint of further improving the penetration resistance of a laminated glass, the average degree of polymerization of the polyvinyl alcohol is particularly preferably 2,700 or higher and 5,000 or lower.

From the viewpoint of further suppressing bubble formation and bubble growth in a laminated glass, with respect to the average degree of polymerization of the polyvinyl alcohol used for providing the polyvinyl acetal resin (1) contained in the first layer, the lower limit thereof is preferably 3,010, preferably 3,050, preferably 3,500, preferably 3,600, preferably 4,000, and preferably 4,050, whereas the upper limit thereof is preferably 7,000, preferably 6,000, preferably 5,000, preferably 4,900, and preferably 4,500. In particular, because bubble formation and bubble growth in a laminated glass can be further suppressed, the sound-insulating property of a laminated glass can be sufficiently improved, and an intermediate film can be easily formed, the average degree of polymerization of the polyvinyl alcohol used for providing the polyvinyl acetal resin (1) contained in the first layer is preferably 3,010 or higher, and more preferably 3,020 or higher, whereas preferably 4,000 or lower, more preferably lower than 4,000, still more preferably 3,800 or lower, particularly preferably 3,600 or lower, and most preferably 3,500 or lower.

The polyvinyl acetal resin (2) and the polyvinyl acetal resin (3) contained in the second layer and the third layer can be produced by acetalizing polyvinyl alcohol. With respect to the average degree of polymerization of the polyvinyl alcohol for providing the polyvinyl acetal resin (2) and the polyvinyl acetal resin (3) contained in the second layer and the third layer, the lower limit thereof is preferably 200, more preferably 500, still more preferably 1,000, and particularly preferably 1,500, whereas the upper limit thereof is preferably 4,000, more preferably 3,500, still more preferably 3,000, and particularly preferably 2,500. If the average degree of polymerization satisfies the preferable lower limit, the penetration resistance of a laminated glass can be further improved. If the average degree of polymerization satisfies the preferable upper limit, an intermediate film can be easily formed.

The average degree of polymerization of the polyvinyl alcohol used for providing the polyvinyl acetal resin (1) contained in the first layer is preferably higher than the average degree of polymerization of the polyvinyl alcohol used for providing the polyvinyl acetal resin (2) and the polyvinyl acetal resin (3) contained in the second layer and the third layer, by preferably 500 or higher, preferably 800 or higher, more preferably 1,000 or higher, still more preferably 1,300 or higher, and particularly preferably 1,800 or higher.

The average degree of polymerization of the polyvinyl alcohol can be determined by the method in conformity with JIS K6726 "Testing methods for polyvinyl alcohol".

The carbon number of the acetal group contained in the polyvinyl acetal resin is not particularly limited. The aldehyde used in production of the polyvinyl acetal resin is not particularly limited. The carbon number of the acetal group in the polyvinyl acetal resin is preferably 3 to 5, and more preferably 3 or 4. If the carbon number of the acetal group in the polyvinyl acetal resin is 3 or higher, the glass transition temperature of an intermediate film can be sufficiently low and the sound-insulating property against structure-borne sounds at low temperatures can be further improved.

The aldehyde is not particularly limited. A suitable aldehyde is commonly a C1-C10 aldehyde. Examples of the C1-C10 aldehyde include propionaldehyde, n-butyl aldehyde, isobutyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde, and benzaldehyde. In particular, propionaldehyde, n-butyl aldehyde, isobutyl aldehyde, n-hexyl aldehyde, or n-valeraldehyde is preferable; propionaldehyde, n-butyl aldehyde, or isobutyl aldehyde is more preferable; and n-butyl aldehyde is still more preferable. Each of the aldehydes may be used alone, or two or more of these may be used in combination.

The polyvinyl acetal resin is preferably a polyvinyl butyral resin. The intermediate film for laminated glass of the present invention preferably contains a polyvinyl butyral resin as each of the polyvinyl acetal resins contained in the first layer, the second layer and the third layer. The polyvinyl butyral resin is easily synthesized. Further, use of the polyvinyl butyral resin enables more suitable achievement of the adhesive force of an intermediate film to a component for laminated glass. In addition, properties such as light resistance and weather resistance can be further improved.

Because bubble formation and bubble growth in a laminated glass can be further suppressed and the sound-insulating property of the laminated glass can be further improved, the polyvinyl acetal resin (1) contained in the first layer is preferably a polyvinyl acetal resin with a degree of acetylation lower than 8 mol % (hereinafter, also referred to as a "polyvinyl acetal resin A") or a polyvinyl acetal resin with a degree of acetylation of 8 mol % or higher (hereinafter, also referred to as a "polyvinyl acetal resin B").

The degree of acetylation a in the polyvinyl acetal resin A is lower than 8 mol %, preferably 7.5 mol % or lower, preferably 7 mol % or lower, preferably 6 mol % or lower, and preferably 5 mol % or lower, whereas preferably 0.1 mol % or higher, preferably 0.5 mol % or higher, preferably 0.8 mol % or higher, preferably 1 mol % or higher, preferably 2 mol % or higher, preferably 3 mol % or higher, and preferably 4 mol % or higher. A degree of acetylation a not higher than the upper limit and not lower than the lower limit can lead to better compatibility between the polyvinyl acetal resin and the plasticizer, and the sound-insulating property of a laminated glass can be further improved.

With respect to the degree of acetalization a of the polyvinyl acetal resin A, the lower limit thereof is preferably 68 mol %, more preferably 70 mol %, still more preferably 71 mol %, and particularly preferably 72 mol %, whereas the upper limit thereof is preferably 85 mol %, more preferably 83 mol %, still more preferably 81 mol %, and particularly preferably 79 mol %. A degree of acetalization a not lower than the lower limit may enable to further improve the sound-insulating property of a laminated glass. A degree of acetalization a not higher than the upper limit enables to shorten the reaction time required for producing the polyvinyl acetal resin A.

The hydroxy group content a in the polyvinyl acetal resin A is preferably 30 mol % or lower, preferably 27.5 mol % or lower, preferably 27 mol % or lower, preferably 26 mol % or lower, preferably 25 mol % or lower, preferably 24 mol % or lower, and preferably 23 mol % or lower, whereas preferably 16 mol % or higher, preferably 18 mol % or higher, preferably 19 mol % or higher, and preferably 20 mol % or higher. A hydroxy group content a not higher than the upper limit may enable to further improve the sound-insulating property of a laminated glass. A hydroxy group content a not lower than the lower limit may enable to further improve the adhesive force of an intermediate film.

The polyvinyl acetal resin A is preferably a polyvinyl butyral resin.

The degree of acetylation b in the polyvinyl acetal resin B is 8 mol % or higher, preferably 9 mol % or higher, preferably 10 mol % or higher, preferably 11 mol % or higher, and preferably 12 mol % or higher, whereas preferably 30 mol % or lower, preferably 28 mol % or lower, preferably 26 mol % or lower, preferably 24 mol % or lower, preferably 20 mol % or lower, and preferably 19.5 mol % or lower. A degree of acetylation b not lower than the lower limit may enable to further improve the sound-insulating property of a laminated glass. A degree of acetylation b not higher than the upper limit may enable to shorten the reaction time required for producing the polyvinyl acetal resin B. In particular, the degree of acetylation b in the polyvinyl acetal resin B is preferably lower than 20 mol % because the reaction time required for producing the polyvinyl acetal resin B can be further shortened.

With respect to the degree of acetalization b in the polyvinyl acetal resin B, the lower limit thereof is preferably 50 mol %, more preferably 52.5 mol %, still more preferably 54 mol %, and particularly preferably 60 mol %, whereas the upper limit thereof is preferably 80 mol %, more preferably 77 mol %, still more preferably 74 mol %, and particularly preferably 71 mol %. A degree of acetalization b not lower than the lower limit may enable to further improve the sound-insulating property of a laminated glass. A degree of acetalization b not higher than the upper limit may enable to shorten the reaction time required for producing the polyvinyl acetal resin B.

The hydroxy group content b in the polyvinyl acetal resin B is preferably 30 mol % or lower, preferably 27.5 mol % or lower, preferably 27 mol % or lower, preferably 26 mol % or lower, and preferably 25 mol % or lower, whereas preferably 18 mol % or higher, preferably 20 mol % or higher, preferably 22 mol % or higher, and preferably 23 mol % or higher. A hydroxy group content b not higher than the upper limit may enable to further improve the sound-insulating property of a laminated glass. A hydroxy group content b not lower than the lower limit may enable to further increase the adhesive force of an intermediate film.

The polyvinyl acetal resin B is preferably a polyvinyl butyral resin.

Each of the polyvinyl acetal resin A and the polyvinyl acetal resin B is preferably obtainable by acetalizing polyvinyl alcohol having an average degree of polymerization exceeding 3,000 with an aldehyde. The aldehyde is preferably a C1-C10 aldehyde, and more preferably a C4 or C5 aldehyde. With respect to the average degree of polymerization of the polyvinyl alcohol, the lower limit thereof is preferably 3,010, preferably 3,050, preferably 3,500, preferably 3,600, preferably 4,000, and preferably 4,050, whereas the upper limit thereof is preferably 7,000, preferably 6,000, preferably 5,000, preferably 4,900, and preferably 4,500. Particularly preferably, the polyvinyl acetal resin A and the polyvinyl acetal resin B in the first layer are obtained by acetalizing polyvinyl alcohol with an average degree of polymerization higher than 3,000 and lower than 4,000. Particularly because bubble formation and bubble growth in a laminated glass can be further suppressed, the sound-insulating property of a laminated glass can be sufficiently improved, and an intermediate film can be easily formed, the average degree of polymerization of the polyvinyl alcohol used for providing the polyvinyl acetal resin A and the polyvinyl acetal resin B in the first layer is preferably 3,010 or higher, and more preferably 3,020 or higher, whereas preferably 4,000 or lower, more preferably lower than 4,000, still more preferably 3,800 or lower, particularly preferably 3,600 or lower, and most preferably 3,500 or lower.

With respect to the weight average molecular weight of each of the polyvinyl acetal resin (1), the polyvinyl acetal resin (2) and the polyvinyl acetal resin (3), the lower limit thereof is preferably 100,000, and more preferably 300,000, whereas the upper limit thereof is preferably 10,000,000, and more preferably 5,000,000. If the weight average molecular weight of the polyvinyl acetal resin is not higher than the preferable lower limit, the strength of an intermediate film may be low. If the weight average molecular weight of the polyvinyl acetal resin exceeds the preferable upper limit, the strength of an intermediate film to be obtained may be too high. The weight average molecular weight herein indicates a weight average molecular weight in terms of polystyrene by gel permeation chromatography (GPC) measurement.

The weight average molecular weight and the number average molecular weight herein indicate a weight average molecular weight and a number average molecular weight, respectively, in terms of polystyrene by gel permeation chromatography (GPC) measurement. For example, in order to measure the weight average molecular weight and the number average molecular weight in terms of polystyrene, polystyrene standard samples with known molecular weights are subjected to GPC measurement. As the polystyrene standard samples ("Shodex Standard SM-105", "Shodex Standard SH-75", SHOWA DENKO K.K.) are used 14 samples with the respective weight average molecular weights of 580, 1,260, 2,960, 5,000, 10,100, 21,000, 28,500, 76,600, 196,000, 630,000, 1,130,000, 2,190,000, 3,150,000, and 3,900,000. Molecular weights are plotted with respect to the corresponding elution times indicated by the peak tops of the peaks of the respective standard samples, and the obtained approximate straight line is used as a calibration curve. A multilayer intermediate film is left in a constant temperature and humidity facility (humidity: 30% (±3%), temperature: 23° C.) for one month, and then the surface layers (the second layer and the third layer) and the intermediate layer (the first layer) are separated. The separated first layer (intermediate layer) is dissolved in tetrahydrofuran (THF) to prepare a 0.1% by weight solution. The obtained solution is analyzed using a GPC device, and thereby the weight average molecular weight and the number average molecular weight are measured. The GPC device used for analyzing the weight average molecular weight and the number average molecular weight may be a GPC device (Hitachi High-Technologies Corp., RI: L2490, auto-sampler: L-2200, pump: L-2130, column oven: L-2350, columns: GL-A120-S and GL-A100MX-S in series) connected with a light scattering detector for GPC (VISCOTEK, Model 270 (RALS+VISCO)).

(Plasticizer)

The first layer contains a plasticizer (1). The second layer contains a plasticizer (hereinafter, also referred to as a plasticizer (2)). The third layer contains a plasticizer (hereinafter, also referred to as a plasticizer (3)). Each of the plasticizer (1), the plasticizer (2), and the plasticizer (3) may include one species of plasticizers, or may include two or more species thereof.

The plasticizer (1) contained in the first layer is not particularly limited as long as the absolute value of the difference between the SP value thereof and the SP value of the polyvinyl acetal resin (1) is 0.5 or smaller. For example, in the case that the plasticizer (1) is a diester compound or the like, the SP value of the plasticizer (1) depends on the type of hydrophobic groups, the degree of hydrophobicity of the hydrophobic groups, the amount of the hydrophobic groups, the type of hydrophilic groups, the degree of hydrophilicity of the hydrophilic groups, and the amount of the hydrophilic groups.

The plasticizer (2) and the plasticizer (3) contained in the second layer and the third layer are not particularly limited. Conventionally known plasticizers can be used as the plasticizer (2) and the plasticizer (3).

Examples of the plasticizer (1), the plasticizer (2), and the plasticizer (3) include organic ester plasticizers such as monobasic organic acid esters and polybasic organic acid esters, and phosphate plasticizers such as organophosphate plasticizers and organophosphite plasticizers. Preferable among these are organic ester plasticizers. The plasticizers are preferably liquid plasticizers.

The monobasic organic acid esters are not particularly limited. Examples thereof include glycol esters obtainable by reaction of a glycol and a monobasic organic acid, and esters of triethylene glycol or tripropylene glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptanoic acid, n-octylic acid, 2-ethylhexylic acid, n-nonylic acid, and decylic acid.

The polybasic organic acid esters are not particularly limited. Examples thereof include ester compounds of a polybasic organic acid and a C4-C8 linear or branched alcohol. Examples of the polybasic organic acid include adipic acid, sebacic acid, and azelaic acid.

The organic ester plasticizers are not particularly limited. Examples thereof include triethylene glycol di-2-ethyl butyrate, triethylene glycol di-2-ethyl hexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethyl butyrate, 1,3-propylene glycol di-2-ethyl butyrate, 1,4-butyrene glycol di-2-ethyl butyrate, diethylene glycol di-2-ethyl butyrate, diethylene glycol di-2-ethyl hexanoate, dipropylene glycol di-2-ethyl butyrate, triethylene glycol di-2-ethyl pentanoate, tetraethylene glycol di-2-ethyl butyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptylnonyl adipate, dibutyl sebacate, oil-modified alkyd sebacate, and a mixture of a phosphate and an adipate. Organic ester plasticizers other than these may also be used.

The organophosphate plasticizers are not particularly limited. Examples thereof include tributoxyethyl phosphate, isodecylphenyl phosphate, and triisopropyl phosphate.

From the viewpoint of further improving the sound-insulating property in a high frequency range of a laminated glass over a wide range of temperature, the plasticizer (1) contained in the first layer and the plasticizer (2) and the plasticizer (3) contained in the second layer and the third layer each are preferably a diester compound represented by the following formula (1).

[Chem. 2]

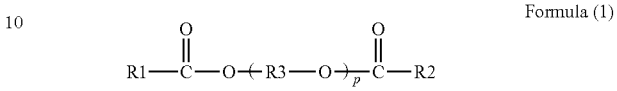

Formula (1)

In the formula (1), R1 and R2 each represent a C1-C10 organic group; R3 represents an ethylene group, an isopropylene group or an n-propylene group; and p is an integer of 2 to 10. In the formula (1), p is preferably 3 or higher. The organic group may be a hydrocarbon group, or may be an organic group having at least one ether bond. If the organic group has no ether bond, p is preferably 3 to 10, while if the organic group has an ether bond, p is preferably 2 to 8.

From the viewpoint of further improving the sound-insulating property in a high frequency range of a laminated glass over a wide range of temperature, the plasticizer (1) is preferably a diester plasticizer represented by the following formula (1A).

[Chem. 3]

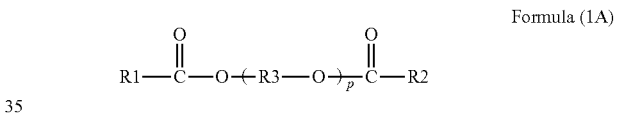

Formula (1A)

In the formula (1A), R1 and R2 each represent a C1-C5 organic group; R3 represents an ethylene group, an isopropylene group, or an n-propylene group; and p is an integer of 2 to 10. The carbon number of the organic group for R1 and R2 in the formula (1A) is more preferably 2 or more, whereas more preferably 4 or less. In the formula (1A), p is preferably 3 or greater, whereas preferably 8 or smaller.

Examples of the plasticizer represented by the formula (1A) include triethylene glycol diacetate (3G1), triethylene glycol di-n-propanoate (3GE), and triethylene glycol di-n-butanoate (3 GB). Preferable among these is triethylene glycol di-n-butanoate (3 GB).

The plasticizer (2) and the plasticizer (3) each are preferably a diester plasticizer represented by the following formula (1B).

[Chem. 4]

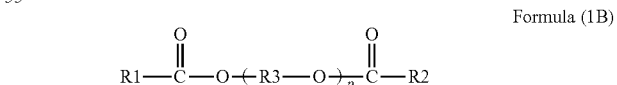

Formula (1B)

In the formula (1B), R1 and R2 each represent a C5-C10 organic group; R3 represents an ethylene group, an isopropylene group, or an n-propylene group; and p is an integer of 3 to 10. In the formula (1B), R1 and R2 each are preferably a C6-C10 organic group.

The plasticizer (2) and the plasticizer (3) each preferably contain at least one of triethylene glycol di-2-ethyl hexanoate (3GO) and triethylene glycol di-2-ethyl butyrate (3 GH), and more preferably contains triethylene glycol di-2-ethyl hexanoate.

In the first layer, the amount of the plasticizer (1) is preferably 20 parts by weight or more, whereas preferably 90 parts by weight or less, for each 100 parts by weight of the polyvinyl acetal resin (1). From the viewpoint of further improving the sound-insulating property in a high frequency range of a laminated glass over a wide range of temperature, the amount of the plasticizer (1) is more preferably 30 parts by weight or more, whereas more preferably 80 parts by weight or less, for each 100 parts by weight of the polyvinyl acetal resin (1) in the first layer. If the amount of the plasticizer (1) is not lower than the lower limit, the penetration resistance of a laminated glass can be further improved. If the amount of the plasticizer (1) is not higher than the upper limit, the transparency of an intermediate film can be further improved.

In each of the second layer and the third layer, the amount of the plasticizer (2) or the plasticizer (3) is preferably 10 parts by weight or more, whereas preferably 50 parts by weight or less, for each 100 parts by weight of the polyvinyl acetal resin (2) or the polyvinyl acetal resin (3). From the viewpoint of further improving the sound-insulating property in a high frequency range of a laminated glass over a wide range of temperature, the amount of the plasticizer (2) or the plasticizer (3) is more preferably 15 parts by weight or more, whereas more preferably 40 parts by weight or less, for each 100 parts by weight of the polyvinyl acetal resin (2) or the polyvinyl acetal resin (3) in each of the second layer and the third layer. If the amount of the plasticizer (2) or the plasticizer (3) is not lower than the lower limit, the penetration resistance of a laminated glass can be further improved. If the amount of the plasticizer (2) or the plasticizer (3) is not higher than the upper limit, the transparency of an intermediate film can be further improved. Further, in the case that the plasticizer (2) and the plasticizer (3) each are a diester plasticizer represented by the formula (1A), the amounts of the plasticizer (2) and the plasticizer (3) each are preferably 10 parts by weigh or more, whereas preferably 30 parts by weight or less for each 100 parts by weight of the polyvinyl acetal resin (2) and the polyvinyl acetal resin (3) in the second layer and the third layer, respectively.

Because the sound-insulating property of a laminated glass may be excellent, the amount of the plasticizer (1) for each 100 parts by weight of the polyvinyl acetal resin (1) in the first layer is preferably larger than each of the amount (2) and the amount (3) of the plasticizers for each 100 parts by weight of each of the polyvinyl acetal resin (2) and the polyvinyl acetal resin (3) in the second layer and the third layer, respectively.

The SP value of the polyvinyl acetal resin A tends to be smaller than the SP value of the polyvinyl acetal resin B. Thus, in the case that the first layer contains the polyvinyl acetal resin A, in order to further improve the sound-insulating property in a high frequency range of a laminated glass over a wide range of temperature, in the plasticizer (1) represented by the formula (1), R1 and R2 each are more preferably an alkyl group with a carbon number of 9 or less, still more preferably an alkyl group with a carbon number of 8 or less, and particularly preferably an alkyl group with a carbon number of 7 or less, whereas more preferably an alkyl group with a carbon number of 2 or more, still more preferably an alkyl group with a carbon number of 3 or more, and particularly preferably an alkyl group with a carbon number of 4 or more. In the case that the first layer contains the polyvinyl acetal resin A, it more preferably further contains triethylene glycol di-n-propanoate (3GE) or triethylene glycol di-n-butanoate (3 GB) as the plasticizer (1), and still more preferably contains triethylene glycol di-n-butanoate (3 GB).

In the case that the first layer contains the polyvinyl acetal resin B, in order to further improve the sound-insulating property in a high frequency range of a laminated glass over a wide range of temperature, in the plasticizer (1) represented by the formula (1), R1 and R2 each are more preferably an alkyl group with a carbon number of 7 or less, still more preferably an alkyl group with a carbon number of 6 or less, and particularly preferably an alkyl group with a carbon number of 5 or less, whereas more preferably an alkyl group with a carbon number of 2 or more, and still more preferably an alkyl group with a carbon number of 3 or more. In the case that the first layer contains the polyvinyl acetal resin B, it more preferably further contains triethylene glycol di acetate (3G1) or triethylene glycol di-n-propanoate (3GE) as the plasticizer (1), and still more preferably contains triethylene glycol di acetate (3G1).

(Other Components)

The first layer, the second layer and the third layer each may contain additives such as an ultraviolet absorber, an antioxidant, a photostabilizer, a flame retardant, an antistatic agent, pigments, dyes, adhesiveness adjuster, an anti-humidity agent, a fluorescent brightener, and an infrared radiation absorber, if necessary. Each of these additives may be used alone, or two or more additives may be used in combination.

(Intermediate Film for Laminated Glass)

The thickness of the first layer is preferably within a range of 0.02 to 1.8 mm. The thickness of the first layer is more preferably 0.05 mm or higher, whereas more preferably 0.5 mm or lower. As the first layer has such a preferable thickness, an intermediate film may not be too thick, and the sound-insulating property of the intermediate film and a laminated glass can be further improved.

The thicknesses of the second layer and the third layer each are preferably within a range of 0.1 to 1 mm. The thicknesses of the second layer and the third layer each are more preferably 0.2 mm or higher, whereas more preferably 0.5 mm or lower. If the thicknesses of the second layer and the third layer each are not lower than the lower limit and not higher than the upper limit, an intermediate film may not be too thick, the sound-insulating property of the intermediate film and a laminated glass can be further improved, and bleed out of the plasticizers can be suppressed.

As the ratio of the thickness of the first layer to the thickness of the intermediate film ((thickness of first layer)/(thickness of intermediate film)) is smaller and the amount of the plasticizer contained in the first layer is larger, bubble formation in a laminated glass is more likely to occur and the bubbles are more likely to grow. Particularly in the case that the ratio in the intermediate film is 0.05 or higher and 0.35 or lower, bubble formation and bubble growth in a laminated glass can be sufficiently suppressed and the sound-insulating property of a laminated glass can be further improved even though the amount of the plasticizer for each 100 parts by weight of the polyvinyl acetal resin is large in the first layer. The ratio ((thickness of first layer)/(thickness of intermediate film)) is preferably 0.06 or higher, more preferably 0.07 or higher, still more preferably 0.08 or higher, and particularly preferably 0.1 or higher, whereas preferably 0.3 or lower, more preferably 0.25 or lower, still more preferably 0.2 or lower, and particularly preferably 0.15 or lower.

The thickness of the intermediate film for laminated glass of the present invention is preferably within a range of 0.1 to 3 mm. The thickness of the intermediate film is more preferably 0.25 mm or higher, whereas more preferably 1.5 mm or lower. If the thickness of the intermediate film is not lower than the lower limit, the penetration resistance of the intermediate film and a laminated glass may be sufficiently high. If the thickness of the intermediate film is not higher than the upper limit, the transparency of an intermediate film may be better.

The method for producing the intermediate film for laminated glass of the present invention is not particularly limited. Conventionally known methods may be applied to the method for producing the intermediate film. For example, a polyvinyl acetal resin and a plasticizer, and other components added as appropriate are kneaded, and then the kneaded product is formed into an intermediate film. A production method including extrusion-molding is preferable because such a method is suitable for continuous production.

The kneading method is not particularly limited. For example, a method using an extruder, a plastograph, a kneader, a Banbury mixer, or a calender roll may be applied. Preferable among these is a method using an extruder, and a method using a twin-screw extruder is more suitable because it is suitable for continuous production. With respect to the intermediate film for laminated glass of the present invention, the first layer, the second layer and the third layer may be separately produced, and then laminated to provide a multi-layer intermediate film, or the first layer and the second layer and the third layer may be laminated by co-extrusion to provide an intermediate film.

Because the producibility of the intermediate film is excellent, the second layer and the third layer preferably contain the same polyvinyl acetal resin; the second layer and the third layer more preferably contain the same polyvinyl acetal resin and the same plasticizer; and the second layer and the third layer are still more preferably formed from the same resin composition.

(Laminated Glass)

Figure 2:
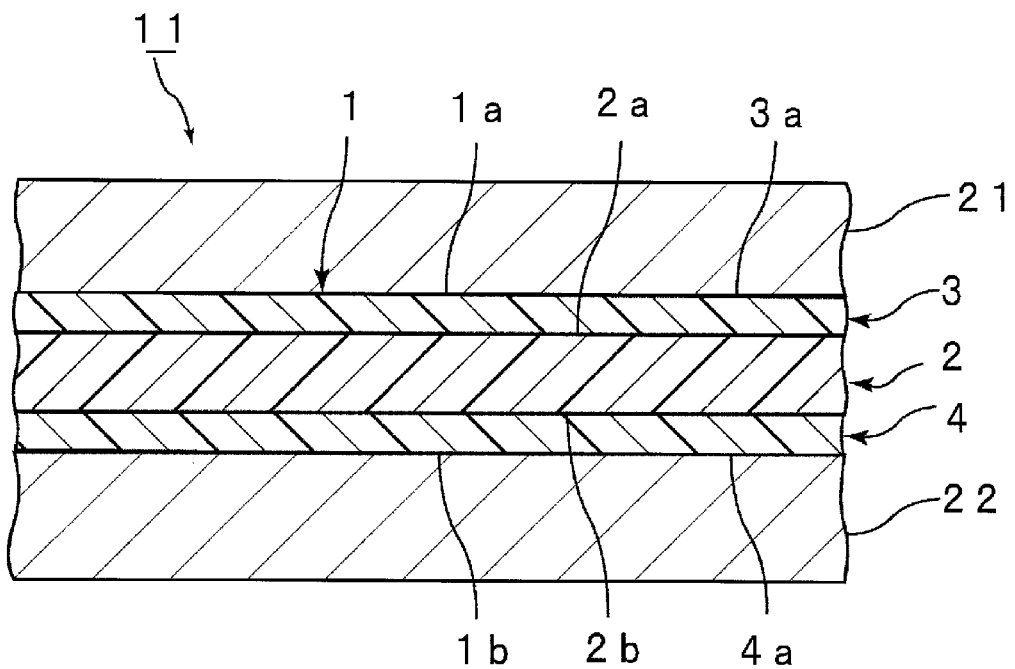
FIG. 2 is a partially cut cross-sectional view schematically showing one example of a laminated glass using the intermediate film for laminated glass shown in FIG. 1.

FIG. 2 is a cross-sectional view showing one example of a laminated glass using the intermediate film for laminated glass according to one embodiment of the present invention.

A laminated glass 11 shown in FIG. 2 comprises an intermediate film 1, a first component for laminated glass 21 and a second component for laminated glass 22. The intermediate film 1 is sandwiched between the first component for laminated glass 21 and the second component for laminated glass 22. The first component for laminated glass 21 is laminated on a first surface 1a of the intermediate film 1. The second component for laminated glass 22 is laminated on a second surface 1b opposite to the first surface 1a of the intermediate film 1. The first component for laminated glass 21 is laminated on an outer surface 3a of the second layer 3. The second component for laminated glass 22 is laminated on an outer surface 4a of the third layer 4.

As mentioned above, the laminated glass of the present invention comprises a first component for laminated glass, a second component for laminated glass, and an intermediate film sandwiched between the first component for laminated glass and the second component for laminated glass, wherein the intermediate film is the intermediate film for laminated glass of the present invention.

Examples of the first component for laminated glass and the second component for laminated glass include glass plates and PET (polyethylene terephthalate) films. The laminated glass includes not only a laminated glass in which an intermediate film is sandwiched between two glass plates, but also a laminated glass in which an intermediate film is sandwiched between a glass plate and a PET film, for example. The laminated glass is a laminate comprising a glass plate, and at least one glass plate is preferably used.

Examples of the glass plate include inorganic glass and organic glass. Examples of the inorganic glass include float plate glass, heat-absorbing plate glass, heat-reflective plate glass, polished plate glass, patterned glass, wired glass, linear-wired glass and green-tinted glass. The organic glass is synthetic resin glass used instead of inorganic glass. Examples of the organic glass include polycarbonate plates and poly(meth)acryl resin plates. Examples of the poly(meth)acryl resin plate include polymethyl (meth)acrylate plates.

The thickness of each of the first component for laminated glass and the second component for laminated glass is not particularly limited, and it is preferably within a range of 1 to 5 mm. In the case that the component for laminated glass is a glass plate, the thickness of the glass plate is preferably within a range of 1 to 5 mm. In the case that the component for laminated glass is a PET film, the thickness of the PET film is preferably within a range of 0.03 to 0.5 mm.

The method for producing the laminated glass is not particularly limited. For example, the intermediate film is sandwiched between the first component for laminated glass and the second component for laminated glass, and then passed through a press roll or put into a rubber bag and decompression-sucked, so that the air remained between the first component for laminated glass and the second component for laminated glass and the intermediate film is removed. Thereafter, the workpiece is pre-bonded at about 70° C. to 110° C. so that a laminate is provided. Next, the laminate is put into an autoclave or pressed so that the laminate is pressed at about 120° C. to 150° C. and a pressure of 1 to 1.5 MPa, and thereby a laminated glass is obtained.

The laminated glass can be used for automobiles, railway carriages, aircrafts, ships, buildings, and the like. The laminated glass can also be used for other applications. The intermediate film is preferably an intermediate film for buildings or vehicles, and more preferably for vehicles. The laminated glass is preferably a laminated glass for buildings or vehicles, and more preferably an intermediate film for vehicles. The intermediate film and the laminated glass can be suitably used for electric vehicles using electric motors and hybrid electric vehicles using internal-combustion engines and electric motors. The laminated glass can be used for windshields, side glasses, rear glasses, and roof glasses of automobiles.

The following will describe the present invention in detail referring to, but not limited to, examples.

In examples and a comparative example, the following polyvinyl acetal resins and plasticizers were used. The degree of acetalization (degree of butyralization), the degree of acetylation, and the hydroxy group content in the polyvinyl acetal resin were measured in conformity with JIS K6728 "Testing Methods for Polyvinyl Butyral". Also in the case of measurement in conformity with ASTM D1396-92, the values were the same as in the method in conformity with JIS K6728 "Testing Methods for Polyvinyl Butyral".

(Polyvinyl Acetal Resin)

Polyvinyl acetal resin a (polyvinyl butyral resin, n-butyl aldehyde was used, degree of acetalization: 65 mol %, degree of acetylation: 12 mol %, hydroxy group content: 23 mol %, SP value: 9.64)

Polyvinyl acetal resin a2 (polyvinyl butyral resin, n-butyl aldehyde was used, degree of acetalization: 65 mol %, degree of acetylation: 12 mol %, hydroxy group content: 23 mol %, SP value: 9.64)

Polyvinyl acetal resin a3 (polyvinyl butyral resin, n-butyl aldehyde was used, degree of acetalization: 65 mol %, degree of acetylation: 12 mol %, hydroxy group content: 23 mol %, SP value: 9.64)

Polyvinyl acetal resin b (polyvinyl butyral resin, n-butyl aldehyde was used, degree of acetalization: 55 mol %, degree of acetylation: 24 mol %, hydroxy group content: 21 mol %, SP value: 9.75)

Polyvinyl acetal resin c (polyvinyl butyral resin, n-butyl aldehyde was used, degree of acetalization: 72 mol %, degree of acetylation: 6 mol %, hydroxy group content: 22 mol %, SP value: 9.5)

Polyvinyl acetal resin c2 (polyvinyl butyral resin, n-butyl aldehyde was used, degree of acetalization: 72 mol %, degree of acetylation: 6 mol %, hydroxy group content: 22 mol %, SP value: 9.5)

Polyvinyl acetal resin d (polyvinyl butyral resin, n-butyl aldehyde was used, degree of acetalization: 78 mol %, degree of acetylation: 1 mol %, hydroxy group content: 21 mol %, SP value: 9.35)

Polyvinyl acetal resin d2 (polyvinyl butyral resin, n-butyl aldehyde was used, degree of acetalization: 78 mol %, degree of acetylation: 1 mol %, hydroxy group content: 21 mol %, SP value: 9.35)

Polyvinyl acetal resin e (polyvinyl butyral resin, n-butyl aldehyde was used, degree of acetalization: 68 mol %, degree of acetylation: 1 mol %, hydroxy group content: 31 mol %)

Polyvinyl acetal resin f (polyvinyl butyral resin, n-butyl aldehyde was used, degree of acetalization: 68 mol %, degree of acetylation: 7.5 mol %, hydroxy group content: 24.5 mol %)

Polyvinyl acetal resin h (polyvinyl butyral resin, n-butyl aldehyde was used, degree of acetalization: 75 mol %, degree of acetylation: 6 mol %, hydroxy group content: 19 mol %)

Polyvinyl acetal resin i (polyvinyl butyral resin, n-butyl aldehyde was used, degree of acetalization: 72 mol %, degree of acetylation: 12 mol %, hydroxy group content: 16 mol %)

The polyvinyl acetal resins contained in the intermediate films of Examples 6 to 15 were obtained by acetalizing polyvinyl alcohol, and each degree of polymerization of the polyvinyl alcohol is shown in Table 1. The polyvinyl acetal resin f was obtained by acetalizing polyvinyl alcohol, and each degree of polymerization of the polyvinyl alcohol was 1,700.

(Plasticizer)
Triethylene glycol diacetate (3G1) (SP value: 9.71)
Triethylene glycol di-n-propanoate (3GE) (SP value: 9.56)
Triethylene glycol di-n-butanoate (3 GB) (SP value: 9.45)
Triethylene glycol di-2-ethyl hexanoate (3GO) (SP value: 9.06)

(Example 1)
(1) Preparation of Intermediate Film

Polyvinyl acetal resin a (100 parts by weight) and a plasticizer (3G1) (60 parts by weight) were sufficiently kneaded using a mixing roll, and thereby a composition for intermediate layer was obtained.

The obtained composition for intermediate layer was sandwiched between two fluororesin sheets with a clearance plate (its thickness is the same as that of an intermediate layer A to be obtained) interposed therebetween, and then press-molded at 150° C. Thereby, an intermediate layer A with a thickness of 0.1 mm was obtained.

Polyvinyl acetal resin e (100 parts by weight) and a plasticizer (3G1) (25 parts by weight) were sufficiently kneaded, and thereby a composition for protecting layer was obtained.

The obtained composition for protecting layer was sandwiched between two fluororesin sheets with a clearance plate (its thickness is the same as that of a protecting layer B to be obtained) interposed therebetween, and then press-molded at 150° C. Thereby, two protecting layers B with a thickness of 0.33 mm were obtained.

The protecting layer B, the intermediate layer A, and the protecting layer B were laminated in this order, and thereby a laminate with a laminated structure of protecting layer B/intermediate layer A/protecting layer B was obtained. The obtained laminate was sandwiched between two fluororesin sheets with a clearance plate (its thickness is the same as that of an intermediate film to be obtained) interposed therebetween, and then press-molded at 150° C. Thereby, a multilayer intermediate film with a thickness of 0.76 mm was obtained.

(2) Preparation of Laminated Glass Used for measurement of loss factor

The obtained intermediate film was cut into a size of 30 mm in length×320 mm in width. Next, the intermediate film was sandwiched between two transparent float glasses (25 mm in length×305 mm in width×2.0 mm in thickness). The workpiece was maintained at 90° C. for 30 minutes using a vacuum laminator and vacuum-pressed, and thereby a laminate was obtained. Portions of the intermediate film bulged out of the glasses in the laminate were cut, and thereby a laminated glass to be used for measurement of loss factor was obtained.

(3) Preparation of Laminated Glass Used in Bubble Formation Test a and Bubble Formation Test B The obtained multilayer intermediate film was cut into a size of 30 cm in length×15 cm in width, and then stored for 10 hours under the 23° C. condition. Embossment was formed on both surfaces of the obtained multilayer intermediate film, and the 10-point average roughness of the embossment was 30 μm. On the cut multilayer intermediate film, 6-mm-diameter through holes were formed at four respective points, each point being an intersection of a position that is 8 cm inside from one edge of the multilayer intermediate film in the length direction and a position that is 5 cm inside from one edge of the multilayer intermediate film in the width direction.

The multilayer intermediate film with the through holes was sandwiched between two transparent float glasses (30 cm in length×15 cm in width×2.5 mm in thickness), and thereby a laminate was obtained. The peripheral edge of the laminate was heat-sealed by 2 cm in width from the edge, and thereby the air remained in the embossment and the air remained in the through holes were sealed. This laminate was press-bonded at 135° C. and 1.2 MPa for 20 minutes, and thereby the residual air was dissolved into the multilayer intermediate film. As a result, a laminated glass to be used in the Bubble formation test A and the Bubble formation test B was obtained. The laminated glass to be used in the Bubble formation test A and the Bubble formation test B was prepared using one of the multilayer intermediate films of Examples 6 to 9 and 13.

Examples 2 to 15 and Comparative Example 1

Except that the types and amounts of the polyvinyl butyral resin and the plasticizer used in the intermediate layer A and the protecting layers B were those shown in Table 1, a multilayer intermediate film and a laminated glass were obtained in the same manner as in Example 1.

Evaluations (1) Measurement of Viscoelasticity

The obtained multilayer intermediate film was stored at 0° C. for two months, and then cut out into a 8-mm-diameter circular shape. The temperature variance of the dynamic viscoelasticity was measured by a shear method using a rheometer ("ARES", Rheometric Scientific, Inc.) under the conditions that a strain of 1.0%, a frequency of 1 Hz, and a temperature-decreasing rate of 5° C./min from 60° C. Thereby, the peak temperature of tan δ at low-temperature side and the peak temperature of tan δ at high-temperature side were measured. The peak temperature of tan δ at low-temperature side indicates the glass transition temperature (Tg) of the intermediate layer A, whereas the peak temperature of tan δ at high-temperature side indicates the glass transition temperature (Tg) of the protecting layer B.

In the same manner, the multilayer intermediate films were stored at the respective temperatures of 15° C., 30° C., and 40° C. for two months, and then the peak temperature of tan δ at low-temperature side and the peak temperature of tan δ at high-temperature side were measured. The peak temperatures of tan δ at high-temperature side were not affected by the storage temperature and were substantially the same peak temperature.

(2) Loss Factor

Laminated glasses to be used for the measurement of loss factor were stored at 0° C., 15° C., 30° C., or 40° C. for 2 months. The loss factor of each stored laminated glass was measured by a center exciting method using a measurement device "SA-01" (RION Co., Ltd.).

The laminated glass stored at 0° C. was evaluated for the loss factor in the 4th mode of resonant frequency (around 3.15 kHz) of the loss factor measured under the 0° C. condition, and the loss factor in the 6th mode of resonant frequency (around 6.3 kHz) of the loss factor measured under the 0° C. condition.

The laminated glass stored at 15° C. was evaluated for the loss factor in the 4th mode of resonant frequency (around 3.15 kHz) of the loss factor measured under the 15° C. condition, and the loss factor in the 6th mode of resonant frequency (around 6.3 kHz) of the loss factor measured under the 15° C. condition.

The laminated glass stored at 30° C. was evaluated for the loss factor in the 4th mode of resonant frequency (around 3.15 kHz) of the loss factor measured at 30° C., and the loss factor in the 6th mode of resonant frequency (around 6.3 kHz) of the loss factor measured at 30° C.

The laminated glass stored at 40° C. was evaluated for the loss factor in the 4th mode of resonant frequency (around 3.15 kHz) of the loss factor measured under the 40° C. condition, and the loss factor in the 6th mode of resonant frequency (around 6.3 kHz) of the loss factor measured under the 40° C. condition.

With respect to the three laminated glasses stored at the respective temperatures, the loss factor was measured under the corresponding temperature condition, and the peak values of the three loss factors were obtained. The average value of the obtained three peak values was shown in Table 2.

(3) Bubble Formation A (State of Bubble Formation)

With respect to each of the multilayer intermediate films in Examples 6 to 9 and 13, five laminated glasses to be used in the bubble formation test A were produced, and then left to stand for 100 hours in a 50° C. oven. The left laminated glasses were visually observed for the presence of bubble formation and the size of the bubbles in a plan view, and the state of bubble formation was evaluated based on the following criteria.

[Criteria for the State of Bubble Formation in the Bubble Formation Test A]

The bubbles generated in the five laminated glasses each were approximated to an ellipse, and the area of the ellipse was defined as the area of the bubble. The areas of the ellipses observed in the five laminated glass were averaged, and the proportion (percentage) of the averaged value (bubble formation area) of the areas of the ellipses to the area (30 cm×15 cm) of the laminated glass was determined.

⊚: No bubble formation was observed in any of five laminated glasses

○: The ratio of the average value (bubble formation area) of the areas of bubble formation was lower than 5%

Δ: The ratio of the average value (bubble formation area) of the areas of bubble formation was 5% or higher and lower than 10% x: The ratio of the average value (bubble formation area) of the areas of bubble formation was 10% or higher (4) Bubble Formation Test B (State of Bubble Formation)

With respect to each of the multilayer intermediate films in Examples 6 to 9 and 13 laminated glasses to be used in the bubble formation test B were produced, and then left to stand for 24 hours in a 50° C. oven. The number of laminated glass in which bubble formation was visually observed among the left laminated glasses was counted, and the state of bubble formation was evaluated based on the following criteria.

[Criteria for the State of Bubble Formation in the bubble formation test B]

⊚: The number of laminated glasses in which bubble formation was visually observed was 5 or less ○: The number of laminated glasses in which bubble formation was visually observed was 6 or more and 10 or less Δ: The number of laminated glasses in which bubble formation was visually observed was 11 or more and 15 or less x: The number of laminated glasses in which bubble formation was visually observed was 16 or more (5) Measurement of Elastic Modulus G' by Test Method B The intermediate film for laminated glass of each of Examples 6 to 9 and 13 was stored in a constant temperature and humidity facility (humidity: 30% (±3%), temperature: 23° C.) for one month. Immediately after the storage for one month, the surface layer, the intermediate layer, and the surface layer were separated, and thereby the intermediate layer was taken out. One gram of the separated intermediate layer was placed in a mold (2 cm in length×2 cm in width×0.76 mm in thickness) disposed between two polyethylene terephthalate (PET) films. The intermediate layer was preheated at a temperature of 150° C. and a pressure of 0 kg/cm$^2$ for 10 minutes, and then press-molded at 80 kg/cm$^2$ for 15 minutes. The press-molded intermediate layer was placed in a hand press set to 20° C. in advance, and then pressed at 10 MPa for 10 minutes. Thereby, the intermediate layer was cooled down. Next, one of the two PET films was peeled off from the mold disposed therebetween, and it was stored in a constant temperature and humidity facility (humidity: 30% (±3%), temperature: 23° C.) for 24 hours. Then, the viscoelasticity was measured using ARES-G2 (TA INSTRUMENTS). The geometry used here was a 8-mm-diameter parallel plate. The measurement was performed under the condition wherein the temperature was lowered from 100° C. to −10° C. at a lowering rate of 3° C./rain and under the condition with a frequency of 1 Hz and a strain of 1%. In the obtained measurement results, the peak temperature of the loss factor was defined as a glass transition temperature Tg (° C.). Further, based on the obtained measurement results and the glass transition temperature Tg, the value of the elastic modulus G'(Tg+30) at (Tg+30)° C. and the value of the elastic modulus G'(Tg+80) at (Tg+80)° C. were read, and the ratio (G'(Tg+80)/G'(Tg+30)) was determined.

[Criteria for Ratio (G'(Tg+80)/G'(Tg+30))]

⊚: 0.75 or higher

○: 0.70 or higher and lower than 0.75

Δ: 0.65 or higher and lower than 0.70

The specifications of the respective intermediate films are shown in Table 1. The measurement results are shown in Tables 2 and 3. *1 represents the "absolute value of the difference between the SP values of the polyvinyl acetal resin and the plasticizer contained in the first layer". *2 represents "(hydroxy group content in polyvinyl acetal resin contained in second layer)−(hydroxy group content in polyvinyl acetal resin contained in first layer)".

TABLE 1

| | | Intermediate layer A | | | | | | | | |
|---|---|---|---|---|---|---|---|---|---|---|
| | | Polyvinyl acetal resin | | | | | | Plasticizer | | |
| | | | | Hydroxy | | | | | | |
| | Type | Degree of acetalization (mol %) | Degree of acetylation (mol %) | group content (mol %) | SP value | Amount (parts by weight) | Degree of polymerization | Type | SP value | Amount (parts by weight) |
| Example 1 | a | 65 | 12 | 23 | 9.64 | 100 | — | 3G1 | 9.71 | 60 |
| Example 2 | a | 65 | 12 | 23 | 9.64 | 100 | — | 3GE | 9.56 | 60 |
| Example 3 | a | 65 | 12 | 23 | 9.64 | 100 | — | 3GB | 9.45 | 60 |
| Example 4 | a | 65 | 12 | 23 | 9.64 | 100 | — | 3GB | 9.45 | 70 |
| Example 5 | a | 65 | 12 | 23 | 9.64 | 100 | — | 3GB | 9.45 | 50 |
| Example 6 | b | 55 | 24 | 21 | 9.75 | 100 | 3300 | 3GB | 9.45 | 60 |
| Example 7 | c | 72 | 6 | 22 | 9.5 | 100 | 3300 | 3GB | 9.45 | 60 |
| Example 8 | d | 78 | 1 | 21 | 9.35 | 100 | 3300 | 3GB | 9.45 | 60 |
| Example 9 | b | 55 | 24 | 21 | 9.75 | 100 | 3300 | 3GE | 9.56 | 60 |
| Example 10 | a2 | 65 | 12 | 23 | 9.64 | 100 | 2400 | 3GB | 9.45 | 60 |
| Example 11 | c2 | 72 | 6 | 22 | 9.5 | 100 | 2600 | 3G1 | 9.71 | 60 |
| Example 12 | d2 | 78 | 1 | 21 | 9.35 | 100 | 2600 | 3G1 | 9.71 | 60 |
| Example 13 | a3 | 65 | 12 | 23 | 9.64 | 100 | 3300 | 3GB | 9.45 | 60 |
| Example 14 | h | 75 | 6 | 19 | 9.32 | 100 | 2600 | 3G1 | 9.71 | 60 |
| Example 15 | i | 72 | 12 | 16 | 9.24 | 100 | 2600 | 3G1 | 9.71 | 60 |
| Comparative Example 1 | a | 65 | 12 | 23 | 9.64 | 100 | — | 3GO | 9.06 | 60 |

| | Protecting layer B | | | | | | | Difference between SP values *1 | Difference between hydroxy group contents *2 |
|---|---|---|---|---|---|---|---|---|---|
| | Polyvinyl acetal resin | | | | | Plasticizer | | | |
| | | | | Hydroxy | | | | | |
| | Type | Degree of acetalization (mol %) | Degree of acetylation (mol %) | group content (mol %) | Amount (parts by weight) | Type | Amount (parts by weight) | | |
| Example 1 | e | 68 | 1 | 31 | 100 | 3G1 | 25 | 0.07 | 8 |
| Example 2 | e | 68 | 1 | 31 | 100 | 3GE | 25 | 0.08 | 8 |
| Example 3 | e | 68 | 1 | 31 | 100 | 3GB | 25 | 0.19 | 8 |
| Example 4 | e | 68 | 1 | 31 | 100 | 3GB | 25 | 0.19 | 8 |
| Example 5 | e | 68 | 1 | 31 | 100 | 3GB | 25 | 0.19 | 8 |
| Example 6 | e | 68 | 1 | 31 | 100 | 3GB | 25 | 0.30 | 10 |
| Example 7 | e | 68 | 1 | 31 | 100 | 3GB | 25 | 0.05 | 9 |
| Example 8 | e | 68 | 1 | 31 | 100 | 3GB | 25 | 0.10 | 10 |
| Example 9 | e | 68 | 1 | 31 | 100 | 3GE | 25 | 0.19 | 10 |
| Example 10 | f | 68 | 7.5 | 24.5 | 100 | 3GE | 25 | 0.19 | 1.5 |
| Example 11 | e | 68 | 1 | 31 | 100 | 3G1 | 25 | 0.21 | 9 |
| Example 12 | e | 68 | 1 | 31 | 100 | 3G1 | 25 | 0.36 | 10 |
| Example 13 | e | 68 | 1 | 31 | 100 | 3GB | 25 | 0.19 | 8 |
| Example 14 | e | 68 | 1 | 31 | 100 | 3G1 | 25 | 0.39 | 12 |
| Example 15 | e | 68 | 1 | 31 | 100 | 3G1 | 25 | 0.47 | 15 |
| Comparative Example 1 | e | 68 | 1 | 31 | 100 | 3GO | 40 | 0.58 | 8 |

TABLE 2

| Measured item Storage temperature and measurement temperature | Viscoelasticity measurement $T_g$ of intermediate layer A (Peak temperature (° C.) of tan δ at low-temperature side) | | | | Viscoelasticity measurement Tg of protecting layer B (Peak temperature (° C.) of tan δ at high-temperature side) | Loss factor (around 3.15 kHz) | | | | Loss factor (around 6.3 kHz) | | | |
|---|---|---|---|---|---|---|---|---|---|---|---|---|---|
| | 0° C. | 15° C. | 30° C. | 40° C. | | 0° C. | 15° C. | 30° C. | 40° C. | 0° C. | 15° C. | 30° C. | 40° C. |
| Example 1 | −7 | −1 | 6 | 10 | 35 | 0.4 | 0.4 | 0.4 | 0.4 | 0.35 | 0.33 | 0.33 | 0.31 |
| Example 2 | −7 | −1 | 6 | 10 | 30 | 0.4 | 0.4 | 0.4 | 0.4 | 0.35 | 0.33 | 0.33 | 0.31 |
| Example 3 | −7 | −1 | 6 | 10 | 30 | 0.4 | 0.4 | 0.4 | 0.4 | 0.35 | 0.33 | 0.33 | 0.31 |

TABLE 2-continued

| Measured item Storage temperature and measurement temperature | Viscoelasticity measurement $T_g$ of intermediate layer A (Peak temperature (° C.) of tan δ at low-temperature side) | | | | Viscoelasticity measurement Tg of protecting layer B (Peak temperature (°C.) of tan δ at high-temperature side) | Loss factor (around 3.15 kHz) | | | | Loss factor (around 6.3 kHz) | | | |
|---|---|---|---|---|---|---|---|---|---|---|---|---|---|
| | 0° C. | 15° C. | 30° C. | 40° C. | | 0° C. | 15° C. | 30° C. | 40° C. | 0° C. | 15° C. | 30° C. | 40° C. |
| Example 4 | −9 | −3 | 4 | 8 | 30 | 0.38 | 0.38 | 0.38 | 0.38 | 0.33 | 0.3 | 0.3 | 0.3 |
| Example 5 | −5 | 1 | 8 | 12 | 30 | 0.38 | 0.38 | 0.39 | 0.39 | 0.33 | 0.3 | 0.3 | 0.3 |
| Example 6 | −7 | −1 | 6 | 10 | 30 | 0.4 | 0.4 | 0.4 | 0.4 | 0.35 | 0.33 | 0.33 | 0.31 |
| Example 7 | −7 | −1 | 6 | 10 | 30 | 0.4 | 0.4 | 0.4 | 0.4 | 0.35 | 0.33 | 0.33 | 0.31 |
| Example 8 | −7 | −1 | 6 | 10 | 30 | 0.4 | 0.4 | 0.4 | 0.4 | 0.35 | 0.33 | 0.33 | 0.31 |
| Example 9 | −7 | −1 | 6 | 10 | 30 | 0.4 | 0.4 | 0.4 | 0.4 | 0.35 | 0.33 | 0.33 | 0.31 |
| Example 10 | −7 | −1 | 6 | 10 | 30 | 0.35 | 0.37 | 0.37 | 0.35 | 0.33 | 0.31 | 0.32 | 0.3 |
| Example 11 | −7 | −1 | 6 | 10 | 30 | 0.4 | 0.4 | 0.4 | 0.4 | 0.35 | 0.33 | 0.33 | 0.31 |
| Example 12 | −9 | −3 | 4 | 8 | 30 | 0.38 | 0.38 | 0.38 | 0.38 | 0.33 | 0.31 | 0.31 | 0.3 |
| Example 13 | −9 | −3 | 4 | 8 | 30 | 0.4 | 0.4 | 0.4 | 0.4 | 0.35 | 0.33 | 0.33 | 0.31 |
| Example 14 | −7 | −1 | 6 | 10 | 35 | 0.39 | 0.4 | 0.4 | 0.39 | 0.34 | 0.33 | 0.33 | 0.31 |
| Example 15 | −7 | −1 | 6 | 10 | 35 | 0.4 | 0.4 | 0.4 | 0.4 | 0.35 | 0.34 | 0.33 | 0.31 |
| Comparative Example 1 | −5 | −3 | 0 | 2 | 33 | 0.15 | 0.38 | 0.38 | 0.13 | 0.14 | 0.3 | 0.3 | 0.11 |

TABLE 3

| | Example 6 | Example 7 | Example 8 | Example 9 | Example 13 |
|---|---|---|---|---|---|
| Bubble formation test A (state of bubble formation) | ⊚ | ⊚ | ⊚ | ⊚ | ⊚ |
| Bubble formation test B (state of bubble formation) | ○ | ○ | ○ | ○ | ○ |
| Test method B: G'(Tg + 80)/G'(Tg + 30) | ⊚ | ⊚ | ⊚ | ⊚ | ⊚ |

EXPLANATION OF SYMBOLS

1: intermediate film
1a: first surface
1b: second surface
2: first layer
2a: first surface
2b: second surface
3: second layer
3a: outer surface
4: third layer
4a: outer surface
11: laminated glass
21: first component for laminated glass
22: second component for laminated glass

The invention claimed is:

1. An intermediate film for laminated glass, comprising:
a first layer which contains a polyvinyl acetal resin and a plasticizer; and
a second layer which is laminated on a first surface of the first layer and which contains a polyvinyl acetal resin and a plasticizer,
wherein an absolute value of the difference between SP values of the polyvinyl acetal resin and the plasticizer contained in the first layer is 0.5 or smaller.

2. The intermediate film for laminated glass according to claim 1,
wherein a hydroxy group content in the polyvinyl acetal resin contained in the first layer is lower than a hydroxy group content in the polyvinyl acetal resin contained in the second layer.

3. The intermediate film for laminated glass according to claim 2,
wherein the hydroxy group content in the polyvinyl acetal resin contained in the first layer is lower than the hydroxy group content in the polyvinyl acetal resin contained in the second layer by 5 mol % or higher.

4. The intermediate film for laminated glass according to claim 1,
wherein a hydroxy group content in the polyvinyl acetal resin contained in the first layer is lower than 25 mol %.

5. The intermediate film for laminated glass according to claim 1,
wherein a hydroxy group content in the polyvinyl acetal resin contained in the second layer is 10 mol % or higher and 50 mol % or lower, and the degree of acetylation therein is lower than 3 mol.

6. The intermediate film for laminated glass according to claim 1,
wherein an amount of the plasticizer is 20 to 90 parts by weight for each 100 parts by weight of the polyvinyl acetal resin in the first layer.

7. The intermediate film for laminated glass according to claim 1,
wherein an amount of the plasticizer is 10 to 50 parts by weight for each 100 parts by weight of the polyvinyl acetal resin in the second layer.

8. The intermediate film for laminated glass according to claim 1,
wherein an amount of the plasticizer is 50 parts by weight or more for each 100 parts by weight of the polyvinyl acetal resin in the first layer,
a hydroxy group content in the polyvinyl acetal resin contained in the first layer is lower than a hydroxy group content in the polyvinyl acetal resin contained in the second layer,
the difference between the hydroxy group content in the polyvinyl acetal resin contained in the first layer and the hydroxy group content in the polyvinyl acetal resin contained in the second layer is 9.2 mol % or smaller, and
the degree of acetylation in the polyvinyl acetal resin contained in the first layer is 8 mol % or lower if the difference between the hydroxy group content in the polyvinyl acetal resin contained in the first layer and the hydroxy group content in the polyvinyl acetal resin contained in the second layer is greater than 8.5 mol % but not greater than 9.2 mol %.

9. The intermediate film for laminated glass according to claim 1,
wherein, in the case that the first layer is used as a resin film and a viscoelasticity of the resin film is measured, a ratio (G'(Tg+80)/(G'(Tg+30)) of an elastic modulus G'(Tg+80) at (Tg+80)° C. to an elastic modulus G'(Tg+30) at (Tg+30)° C. is 0.65 or higher, provided that Tg (° C.) represents a glass transition temperature of the resin film.

10. The intermediate film for laminated glass according to claim 1,
wherein the polyvinyl acetal resin contained in the first layer is obtained by acetalizing polyvinyl alcohol having an average degree of polymerization exceeding 3000.

11. The intermediate film for laminated glass according to claim 1,
wherein the degree of acetylation in the polyvinyl acetal resin contained in the first layer is 8 mol % or higher, or the degree of acetylation in the polyvinyl acetal resin contained in the first layer is lower than 8 mol %, and a degree of acetalization therein is 68 mol % or higher.

12. The intermediate film for laminated glass according to claim 11,
wherein the degree of acetylation in the polyvinyl acetal resin contained in the first layer is 8 mol % or higher.

13. The intermediate film for laminated glass according to claim 11,
wherein the degree of acetylation in the polyvinyl acetal resin contained in the first layer is lower than 8 mol %, and
the degree of acetalization therein is 68 mol % or higher.

14. The intermediate film according to claim 1, further comprising:
a third layer which is laminated on a second surface that is opposite to the first surface of the first layer and which contains a polyvinyl acetal resin and a plasticizer.

15. A laminated glass, comprising:
a first component for laminated glass;
a second component for laminated glass; and
an intermediate film sandwiched between the first component for laminated glass and the second component for laminated glass,
wherein the intermediate film is the intermediate film for laminated glass according to claim 1.

* * * * *